(12) United States Patent
Ueno et al.

(10) Patent No.: US 7,227,524 B2
(45) Date of Patent: Jun. 5, 2007

(54) IMAGE DISPLAY APPARATUS AND METHOD

(75) Inventors: Satoshi Ueno, Tenri (JP); Yasuhiro Yoshida, Nara (JP); Hiroyuki Furukawa, Ueno (JP); Yoichi Yamamoto, Nara (JP); Akira Yamaguchi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 312 days.

(21) Appl. No.: 10/446,822

(22) Filed: May 29, 2003

(65) Prior Publication Data
US 2003/0231195 A1    Dec. 18, 2003

(30) Foreign Application Priority Data

May 29, 2002  (JP)  ............................ 2002-156511
Jan. 22, 2003  (JP)  ............................ 2003-014051

(51) Int. Cl.
G09G 3/36    (2006.01)

(52) U.S. Cl. ..................... 345/89; 345/204; 345/690; 345/94

(58) Field of Classification Search ............ 345/88–89, 345/63, 72, 77, 83, 690–692, 204, 600–605
See application file for complete search history.

(56) References Cited

U.S. PATENT DOCUMENTS 5,122,784 A * 6/1992 Canova ..................... 345/605
5,784,040 A * 7/1998 Kobayashi et al. .......... 345/89
5,907,370 A * 5/1999 Suzuki et al. ............... 348/607
6,064,367 A * 5/2000 Horioka ...................... 345/605
6,313,817 B2 * 11/2001 Kuijk .......................... 345/87
6,329,980 B1 * 12/2001 Uehara et al. .............. 345/204
6,556,180 B1 * 4/2003 Furuhashi et al. .......... 345/87
6,778,184 B2 * 8/2004 Arita et al. .................. 345/589
6,882,351 B2 * 4/2005 Morita ........................ 345/690

FOREIGN PATENT DOCUMENTS

JP    2003-333348 (A)    11/2003

OTHER PUBLICATIONS

Japanese Office Action issued on Dec. 16, 2005.

* cited by examiner

*Primary Examiner*—Lun-Yi Lao
(74) *Attorney, Agent, or Firm*—Harness, Dickey & Pierce, P.L.C.

(57) ABSTRACT

An image processing apparatus, for processing an image signal representing pixel values of pixels so as to display an image including the pixels by an image display apparatus, includes a detection section for detecting a low frequency portion of the image signal, which corresponds to a first series of pixels having a first pixel value and a second series of pixels having a second pixel value different from the first pixel value, the second series of pixels following the first series of pixels; and a signal expansion section for expanding a prescribed portion of the low frequency portion of the image signal, the prescribed portion including at least one of the first series of pixels and the second series of pixels, such that the first pixel value is gradually changed to the second pixel value.

14 Claims, 30 Drawing Sheets

FIG.29

| 1 | 2 | 3 | 4 | ... | 640 |
|---|---|---|---|-----|-----|
| 641 | 642 | 643 | 644 | ... | 1280 |
| 1281 | 1282 | 1283 | 1284 | ... | 1920 |

| 64 | 64 | 64 | ... |
|----|----|----|-----|
| 64 | 64 | 64 | ... |
| 64 | 64 | 64 | ... |

(640×480)

IMAGE DISPLAY APPARATUS AND METHOD

BACKGROUND OF THE INVENTION

1. Field of the Invention

The present invention relates to an image processing apparatus, an image processing method, an image display apparatus using the same, and a mobile electronic device such as a mobile phone.

2. Description of the Related Art

Recently, technologies for displaying high definition images in the field of image display apparatus, for example, technologies for displaying precise CG (computer graphics) images and displaying other images more realistically have been developed. However, there are strong demands for displaying more highly gray-scaled and higher definition images by image display apparatuses than the images so far realized by the development of the image display technologies.

In image display apparatuses using digital signals as image signals, six to eight bits of an image signal are assigned to each of R (red), G (green) and B (blue) data. Due to the strong demands for displaying more highly gray-scaled and higher definition images, demands for using digital signals having a larger number of bits are expected to be increased in the future.

A main stream image display apparatus, which assigns six to eight bits of an image signal represented by 16 bits to each of R, G and B data, will be specifically described.

Image display data used in this type of image display apparatus can display 65536 colors since $2^{16}$=65536. For displaying RGB color images with the 65536 color image display data, the 5-6-5 format is generally used. With this format, 5 bits are assigned to R data, 6 bits are assigned to G data, and 5 bits are assigned to B data. Thus, the image display data has 16 bits in total.

In a TFT liquid crystal display panel unit, 6 bits are assigned, as a value representing a gray scale level, to each of R, G and B data. Thus, the image display data has 18 bits in total.

An image signal corresponding to an input digital image signal is output for processing.

In order to match a 16-bit digital image signal with such a TFT liquid crystal display panel unit, gray scale compensation is performed for expanding R-pixel image display data and B-pixel image display data, which are each assigned 5 bits, to 6-bit image display data.

For such gray scale compensation, the following three systems are mainly used: (1) LSB (Least Significant Bit) fixing system, (2) MSB (most significant bit) repeating system, and (3) gray scale palette system.

According to (1) the LSB fixing system, one bit is added as the LSB to the 5-bit image display data so as to create 6-bit image display data. As the LSB, "1" or "0" is automatically set.

According to (2) the MSB repeating system, one bit is added as the LSB to the 5-bit image display data so as to create 6-bit image display data. As the LSB, the same value as the MSB is set, unlike (1) the LSB fixing system.

According to (3) the gray scale palette system, 5-bit image display data and 6-bit image display data is associated with each other by a palette referred to as a look-up table (LUT) or a conversion table. When one value represented by 5-bit image display data is input, the 6-bit image display data corresponding to that one value is output.

For improving the degree of gray scale, pseudo gray scale systems are available. Generally known pseudo gray scale systems include (4) dither system, (5) error diffusion system, and (6) FRC (Frame Rate Control) system.

According to (4) the dither system, reference pixel values are defined. In a certain area of pixels, discrete reference pixel values are used to display pixels having pixel values which are different from the reference pixel values. The ratio of the number of pixels having the non-reference pixel values with respect to the number of pixels having the reference pixel values (i.e., expression ratio) is first found. Then, in accordance with the expression ratio, the gradations between the reference pixel values (intermediate tones) are displayed.

According to (5) the error diffusion system, the pixel value of one pixel is quantized (or binarized). The difference between the quantized value and the original pixel value (i.e., quantization error) is assigned to the pixel values of surrounding pixels. Thus, the intermediate tones are displayed.

According to (6) the FRC system, reference values are defined. In a certain time period (e.g., one frame), discrete reference pixel values are used to display pixels having pixel values which are different from the reference pixel values. The ratio of a time period in which the pixels having the reference pixel values are displayed with respect to a time period in which the pixels having non-reference pixel values are displayed is found. Using this ratio, the gradations between the reference pixel values (intermediate tones) are displayed.

The systems (1), (2) and (3) have problems in terms of color reproducibility (gray scale reproducibility). This will be described hereinafter. In the following description, pixel value 00h of 5-bit image display data and 6-bit image display data is a pixel value corresponding to the darkest display. Pixel value 1Fh of 5-bit image display data and pixel value 3Fh of 6-bit image display data are each a pixel values corresponding to the brightest display.

(1) The LSB fixing system has the following problem. In the case where the gray scale expansion is performed by adding "0" to the LSB of color component image display data of the original image data, pixel value 1Fh (corresponding to the brightest display of 5-bit image display data) is converted into pixel value 3Eh. As a result, the brightest display (3Fh) which is possible with a display panel cannot be displayed. In the case where the gray scale expansion is performed by adding "1" to the LSB of color component image display data of the original image data, pixel value 00h (corresponding to the darkest display of 5-bit image display data) is converted into pixel value 01h of 6-bit image display data. As a result, the darkest display (00h) which is possible with a display panel cannot be displayed.

(2) The MSB repeating system has the following problem. Continuous pixel values of 5-bit image display data (for example, 0Fh and 10h) are converted into pixel values 1Eh and 21h of 6-bit image display data, which are not continuous. As a result, continuous brightness cannot be displayed.

(3) The gray scale palette system has the following problem. Once a palette for converting 5-bit image display data into 6-bit image display data is set, the same palette is used for all the images. The palette needs to be newly set each time different types of images (for example, graphic images, animation images and other general images) are to be displayed. This increases the workload of the user.

The problems of the systems (1), (2) and (3) are caused by the fact that the display capability ($2^6$=64 gradations) of the display panel of 6-bit image display data cannot be fully utilized. In the systems (1) and (2), either "0" or "1" is automatically added as the LSB. Therefore, the actual display is limited to 5-bit display ($2^5$=32 gradations). In the system (3), the number of types of data which can be included in a palette is 32.

When the display capability of the display panel cannot be fully utilized as above, the following problem may occur in addition to the above problems. In the systems (1), (2) and (3), the number of bits of image display signals is insufficient. Therefore, generally in an image, a portion, which should be represented by smooth graduation change, may undesirably be represented by stepwise stripes (such stripes will be referred to as "pseudo profile").

The systems (4), (5) and (6) can improve the degree of gray scale capability of the image display apparatus when the number of gray scale bits of an input image signal is larger than the number of gray scale bits of the image display apparatus, i.e., when the gray scale capability of the image display apparatus is insufficient for the input image signal. However, when the number of gray scale bits of an input image signal is smaller than the number of gray scale bits of the image display apparatus, the display corresponding to the number of gray scale bits exceeding that of the input image signal is not performed, although the gray scale capability of the image display apparatus is sufficient for performing such a display. In other words, the gray scale capability of the image display apparatus cannot be fully utilized.

SUMMARY OF THE INVENTION

According to one aspect of the invention, an image processing apparatus, for processing an image signal representing pixel values of pixels so as to display an image including the pixels by an image display apparatus, includes a detection section for detecting a low frequency portion of the image signal, which corresponds to a first series of pixels having a first pixel value and a second series of pixels having a second pixel value different from the first pixel value, the second series of pixels following the first series of pixels; and a signal expansion section for expanding a prescribed portion of the low frequency portion of the image signal, the prescribed portion including at least one of the first series of pixels and the second series of pixels, such that the first pixel value is gradually changed to the second pixel value.

In one embodiment of the invention, the image processing apparatus further includes a block formation section for dividing the image signal into a plurality of blocks, each of the blocks corresponding to a prescribed number of pixels. The image signal divided into the plurality of blocks is detected and expanded.

In one embodiment of the invention, the plurality of pixels are arranged in a plurality of rows and a plurality of columns. The block formation section divides the image signal such that borders between the plurality of blocks are random with respect to the plurality of columns.

In one embodiment of the invention, the detection section determines whether a difference between a value representing the position of the first pixel of the first series of pixels and a value representing the position of the first pixel of the second series of pixels is equal to a value representing the width of the first series of pixels, so as to determine whether the image signal is to be expanded or not.

In one embodiment of the invention, when the signal expansion section adds bits having a fixed value to a portion of the image signal which is not expanded.

In one embodiment of the invention, a difference between the first pixel value and a second pixel value is 1 in the low frequency portion.

In one embodiment of the invention, the signal expansion section expands a portion from the center of the first series of pixels and the center of the second series of pixels.

In one embodiment of the invention, the signal expansion section adds 2 bits to at least one of a portion of the image signal corresponding to pixels having the first pixel value and a portion of the image signal corresponding to pixels having the second pixel value.

In one embodiment of the invention, the signal expansion section adds 4 bits to at least one of a portion of the image signal corresponding to pixels having the first pixel value and a portion of the image signal corresponding to pixels having the second pixel value.

In one embodiment of the invention, the signal expansion section expands the image signal such that the first pixel value is gradually changed to the second pixel value on a straight line or a curved line.

In one embodiment of the invention, the first series of pixels and the second series of pixels are arranged in at least one of a horizontal direction in which the image signal is transferred, a vertical direction which is perpendicular to the horizontal direction, and an oblique direction which are oblique with respect to the horizontal direction and the vertical direction.

In one embodiment of the invention, a number of gray scale bits handled by the image display apparatus is larger than a number of gray scale bits represented by the image signal.

According to another aspect of the invention, an image processing method, for processing an image signal representing pixel values of pixels so as to display an image including the pixels by an image display apparatus, the image processing apparatus, includes the steps of detecting a low frequency portion of the image signal, which corresponds to a first series of pixels having a first pixel value and a second series of pixels having a second pixel value different from the first pixel value, the second series of pixels following the first series of pixels; and expanding a prescribed portion of the low frequency portion of the image signal, the prescribed portion including at least one of the first series of pixels and the second series of pixels, such that the first pixel value is gradually changed to the second pixel value.

In one embodiment of the invention, the image processing method further includes the step of dividing the image signal into a plurality of blocks, each of the blocks corresponding to a prescribed number of pixels. The image signal divided into the plurality of blocks is detected and expanded.

According to still another aspect of the invention, an image display apparatus includes the above-described image processing apparatus for displaying an image using an image signal expanded by the image processing apparatus.

According to still another aspect of the invention, a mobile electronic device includes the above-described image display apparatus. The image display apparatus is a liquid crystal display apparatus.

An image processing apparatus according to the present invention includes a detection section and a signal expansion section. The detection section detects a low frequency portion of an image signal which is represented by bits. The low frequency portion corresponds to a first series of pixels having a first pixel value and a second series of pixels having a second pixel value, which is different from the first pixel value. The second series of pixels follow the first series of pixels. The signal expansion section expands a prescribed portion of the low frequency portion of the image signal. The prescribed portion includes the first series of pixels and/or the second series of pixels. More specifically, the expansion is performed such that the first pixel value is gradually changed to the second pixel value.

Therefore, according to the present invention, the image display capability of the display panel can be fully utilized, and smooth gradation change is realized. The pseudo profile, i.e., stepwise stripes of gradations, can be eliminated.

According to the present invention, a low frequency portion of an image signal detected by the detection section as a target of signal expansion is processed as follows. A prescribed number of bits are added by the signal expansion section. To the portion which is not a target of signal expansion, bits "00" are added, so that the number of bits of this portion is equal to that of the expanded portion. Thus, according to the present invention, a prescribed number of bits is not automatically added. The display capability of the image display apparatus can be fully utilized. Therefore, the problem that the brightest point or the darkest point is eliminated and the image is displayed based on significantly discrete pixels is avoided.

Thus, the invention described herein makes possible the advantages of providing an image processing apparatus and an image processing method for expanding an input image signal so as to fully utilize the display capability of the display panel, an image display apparatus and a mobile electronic device, such as a cellular phone, using the same.

These and other advantages of the present invention will become apparent to those skilled in the art upon reading and understanding the following detailed description with reference to the accompanying figures.

BRIEF DESCRIPTION OF THE DRAWINGS

FIG. 29 shows a display section of an image display apparatus in the third example;

FIG. 30 shows a display section of the image display apparatus in the third example, illustrating a plurality of blocks in an exemplary manner.

DESCRIPTION OF THE PREFERRED EMBODIMENTS

Hereinafter, the present invention will be described by way of illustrative examples with reference to the accompanying drawings.

EXAMPLE 1

In a first example of the present invention, an image processing apparatus for expanding a 6-bit digital image signal into an 8-bit digital image signal to be supplied to a liquid crystal panel will be described. The liquid crystal panel used in the first example has a display area of 640 pixel (horizontal)×480 pixels (vertical).

It should be noted that the image processing apparatus according to the present invention is not limited to an apparatus for processing images to be supplied to a liquid crystal panel. The liquid crystal panel used with the image processing apparatus of the present invention is not limited to have a display area of 640 pixels×480 pixels. These are merely exemplary.

The image processing apparatus in the first example has a structure suitable for products demanded to be produced at low cost, for example, cellular phones, PDAs and other compact display apparatus.

Figure 1:
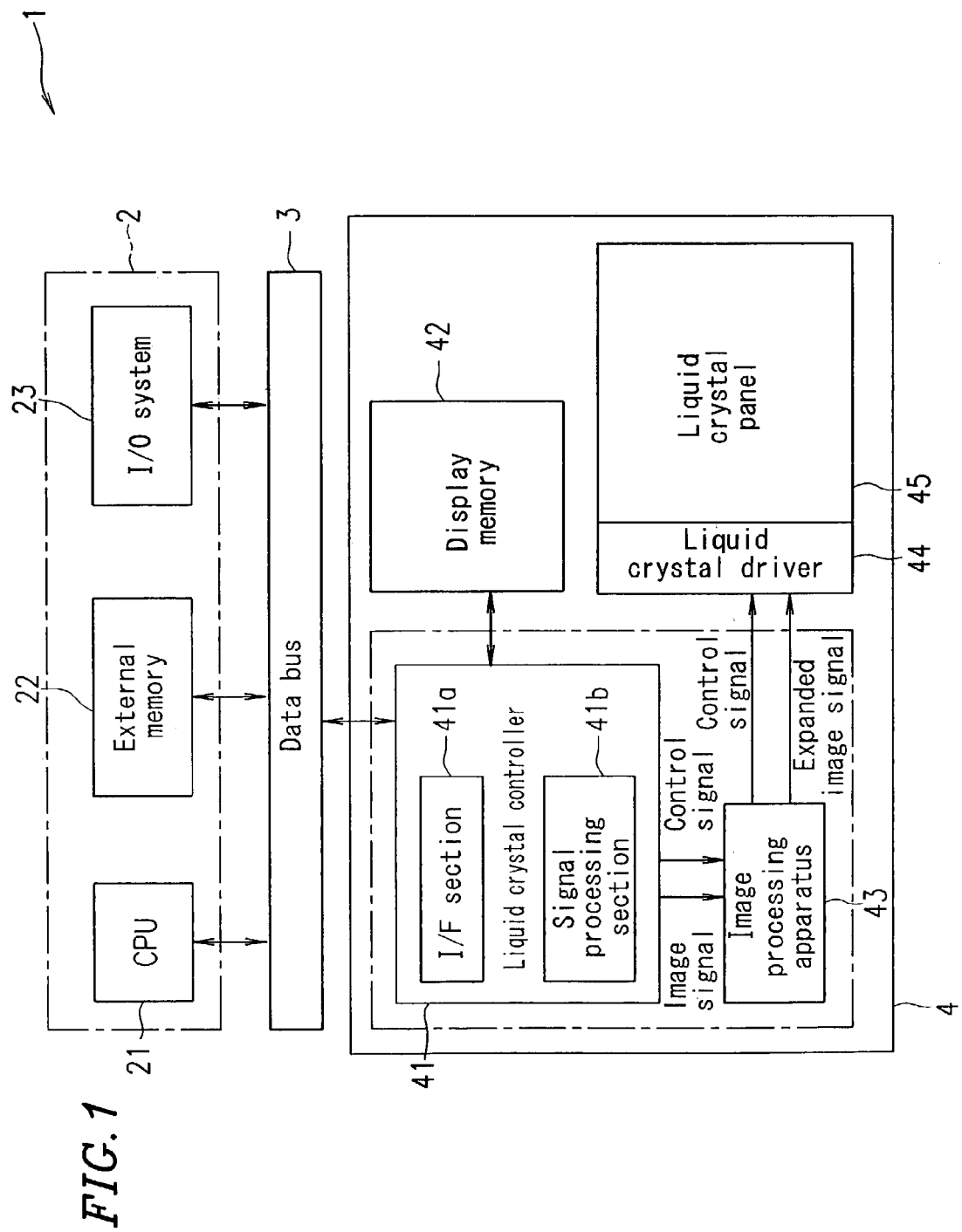
FIG. 1 is a block diagram of a liquid crystal display apparatus used in a first example of the present invention.

FIG. 1 is a block diagram illustrating a liquid crystal display apparatus 1 including an image processing apparatus.

The liquid crystal display apparatus 1 includes a liquid crystal display module 4 and an external host system 2 which are connected to each other via a data bus 3.

The external host system 2 includes a CPU (central processing unit) 21, an external memory 22, and an I/O (input/output) system 23, which are each connected to the data bus 3.

The liquid crystal module 4 includes a liquid crystal controller 41, a display memory 42, an image processing apparatus 43, a liquid crystal driver 44 and a liquid crystal panel 45. In the first example, the image processing apparatus 43 is connected between the liquid crystal controller 41 and the liquid crystal driver 44. The image processing apparatus 43 processes 6-bit image data which is output from the liquid crystal controller 41 in a prescribed manner so as to covert the 6-bit image signal into 8-bit image data, and outputs the 8-bit image data to the liquid crystal driver 44.

The liquid crystal controller 41 includes an I/F section 41a and a signal processing section 41b, and is connected to the data bus 3. The liquid crystal controller 41 is connected to a display memory 42, and outputs an image signal and a control signal to the image processing apparatus 43 based on display information and control information stored in the display memory 42. The image processing apparatus 43 processes the image signal and the control signal as described below so as to generate an expanded image signal, and outputs the expanded image signal to the liquid crystal driver 44. Based on the expanded image signal and the control signal from the image processing apparatus 43, the liquid crystal driver 44 causes the liquid crystal panel 45 to display an image. The liquid crystal panel 45 acts as a display panel. In the liquid crystal panel 45, a plurality of pixels are arranged in a plurality of rows and a plurality of columns.

Figure 2:
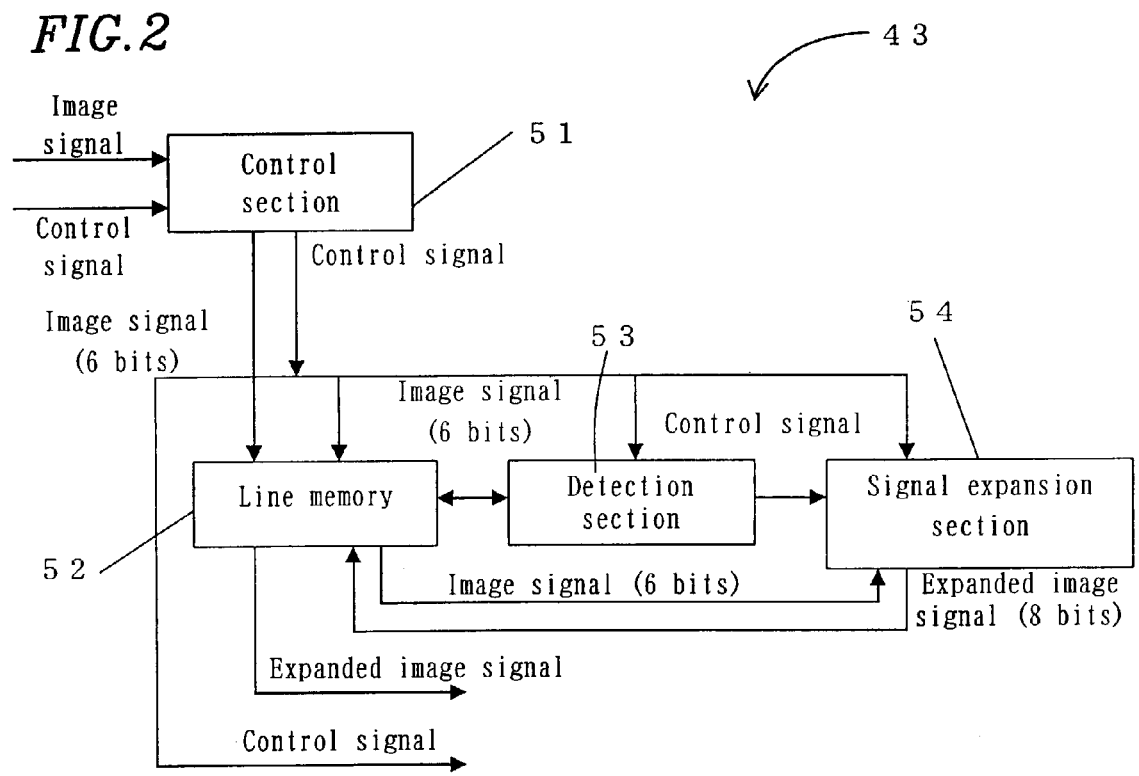
FIG. 2 is a block diagram of an image processing apparatus according to the first example of the present invention.

FIG. 2 is a block diagram illustrating a partial structure of the image processing apparatus 43 shown in FIG. 1.

The image processing apparatus 43 includes a control section 51, a line memory 52, a detection section 53, and a signal expansion section 54.

The control section 51 receives a 6-bit image signal and a control signal which are output from the liquid crystal controller 41. The control signal is output to each of the line memory 52, the detection section 53, the signal expansion section 54, and the liquid crystal driver 44. The 6-bit image signal is output to the line memory 52. The control section 51 controls the line memory 52, the detection section 53, and the signal expansion section 54, such that image data processed by these sections are synchronized with the control signal when being output to the liquid crystal driver 44.

The line memory 52 sequentially reads the 6-bit image signal from the control section 51 while synchronizing the 6-bit image signal to the control signal, line by line, i.e., in units of 640 pixels. The line memory 52 also reads the 8-bit expanded image signal which is generated by the signal expansion section 54 and outputs the 8-bit expanded image signal to the liquid crystal driver 44.

The detection section 53 reads the 6-bit image signal which is output from the line memory 52, and detects a portion of the image signal which is represented by stepwise or discontinuous gradation change, i.e., a pseudo profile. The pseudo profile is caused by insufficient number of bits of image signals, and deteriorates the image quality. Generally in an image, the pseudo profile is stepwise stripes of gradations.

More specifically, the detection section 53 performs the following operation regarding a 6-bit image signal. The detection section 53 detects an image pattern in which two or more pixels having the same pixel value L (L is an arbitrary integer of 0 through 63) are continuous and the two or more pixels are followed by two or more pixels having the same pixel value (L+1) or (L−1). The detection section 53 also stores the value representing the position of the first pixel among the continuous pixels having the same pixel values, and the width (number of pixels) of the continuous pixels having the same pixel values. The detection section 53 outputs the position and the width to the signal expansion section 54.

The signal expansion section 54 adds 2 lowest bits to the 6-bit image signal corresponding to pixels which are detected by the detection section 53 and are a target of the signal expansion, thereby generating an 8-bit image signal The addition of 2 bits is performed as described later, such that the discontinuous portion of the image caused by the insufficient number of bits is eliminated and the smooth gradation change is realized. To the image signal corresponding to pixels which are not a target of the signal expansion, 2 lowest bits "00" are added, thereby generating an 8-bit image signal. Thus, all the 6-bit image signals are expanded to 8-bit image signals. The 8-bit image signals expanded by the signal expansion section 54 are written to the line memory 52.

The detection section 53 and the signal expansion section 54 perform the above-described processing for each of R, G and B pixels, and line by line. 480 lines of signals are processed sequentially, and thus one image is displayed.

In the first example, when the difference between the pixel values of two adjacent pixel island it is detected that two or more pixels having the same pixel values are continuous, signal expansion is performed. The present invention is not limited to this, and threshold values such as the difference between the pixel values of two adjacent pixel and the number of continuous pixels for signal expansion can be freely set.

Figure 3:
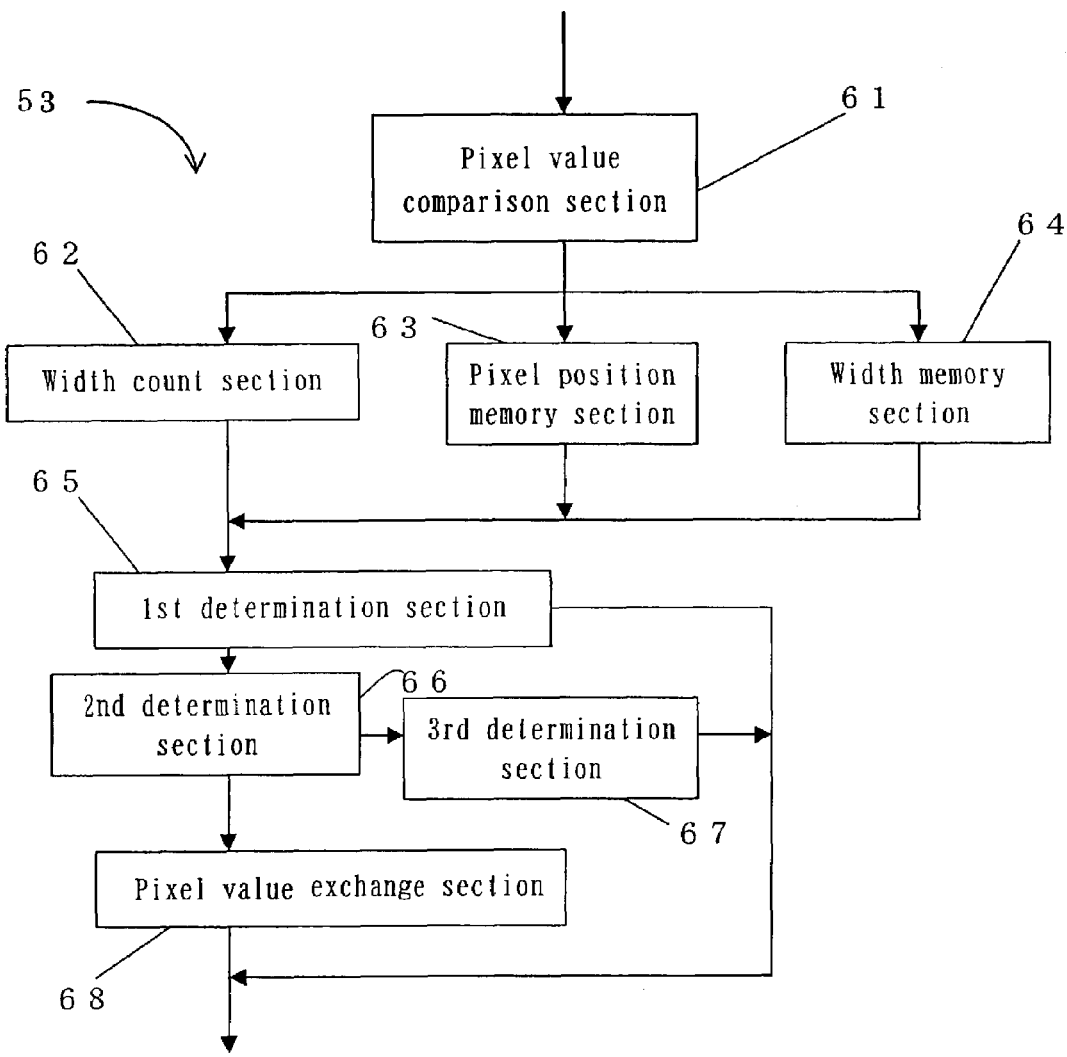
FIG. 3 is a block diagram of a detection section of the image processing apparatus in the first example.

Next, the structure of the detection section 53 will be described in more detail with reference to FIG. 3.

The detection section 53 includes a pixel value comparison section 61, a width count section 62, a pixel position memory section 63, a width memory section 64, first through third determination sections 65 through 67, and a pixel value exchange section 68.

The pixel value comparison section 61 is connected to the line memory 52 (FIG. 2) and compares whether the pixel values of adjacent pixels which are read from the line memory 52 are equal to each other or not.

The width count section 62 is connected to the pixel value comparison section 61. When the comparison result of the pixel value comparison section 61 shows that the pixel values of the adjacent pixels are equal to each other (i.e., the pixels having the same pixel value are continuous), the width count section 62 adds "1" to the width of the image data.

The pixel position memory section 63 is connected to the pixel value comparison section 61. When the comparison result of the pixel value comparison section 61 shows that the pixel values of the adjacent pixels are equal to each other (i.e., the pixels having the same pixel value are continuous), the pixel position memory section 63 stores the value representing the position of the first pixel among the continuous pixels.

The width memory section 64 is connected to the pixel value comparison section 61. When the comparison result of the pixel value comparison section 61 shows that a first series of pixels having the same pixel value is terminated, the width memory section 64 stores the width of the pixels having the same pixel value (number of pixels).

The first determination section 65 is connected to the width count section 62, the pixel position memory section 63, and the width memory section 64. The first determination section 65 determines whether or not the difference between (i) the value representing the position of the first pixel of the first series of pixels having the same pixel value (stored by the pixel position memory section 63) and (ii) the value representing the position of the first pixel of the next (second) series of pixels having the same pixel value is equal to the width stored by the width memory section 64.

The second determination section 66 is connected to the first determination section 65. The second determination section 66 determines whether or not the pixel value of the first series of pixels having the same pixel values is larger by 1 than the pixel value of the second series of pixels having the same pixel values.

The third determination section 67 is connected to the second determination section 66. The third determination section 67 determines whether or not the pixel value of the first series of pixels having the same pixel values is smaller by 1 than the pixel value of the second series of pixels having the same pixel values.

When the determination result of the first determination section 65 is "equal" and the determination result of the second determination section 66 is "larger by 1", the signal exchange section 68 symmetrically exchanges the image data in the line memory 52 to be processed by signal expansion, as described later.

The processing performed by the pixel value comparison section 61, the width count section 62, the pixel position memory section 63, and the width memory section 64 will be described below with reference to FIG. 5. The processing performed by the first determination section 65, the second determination section 66, and the third determination section 67, and the pixel value exchange section 68 will be described below with reference to FIG. 6.

Figure 4:
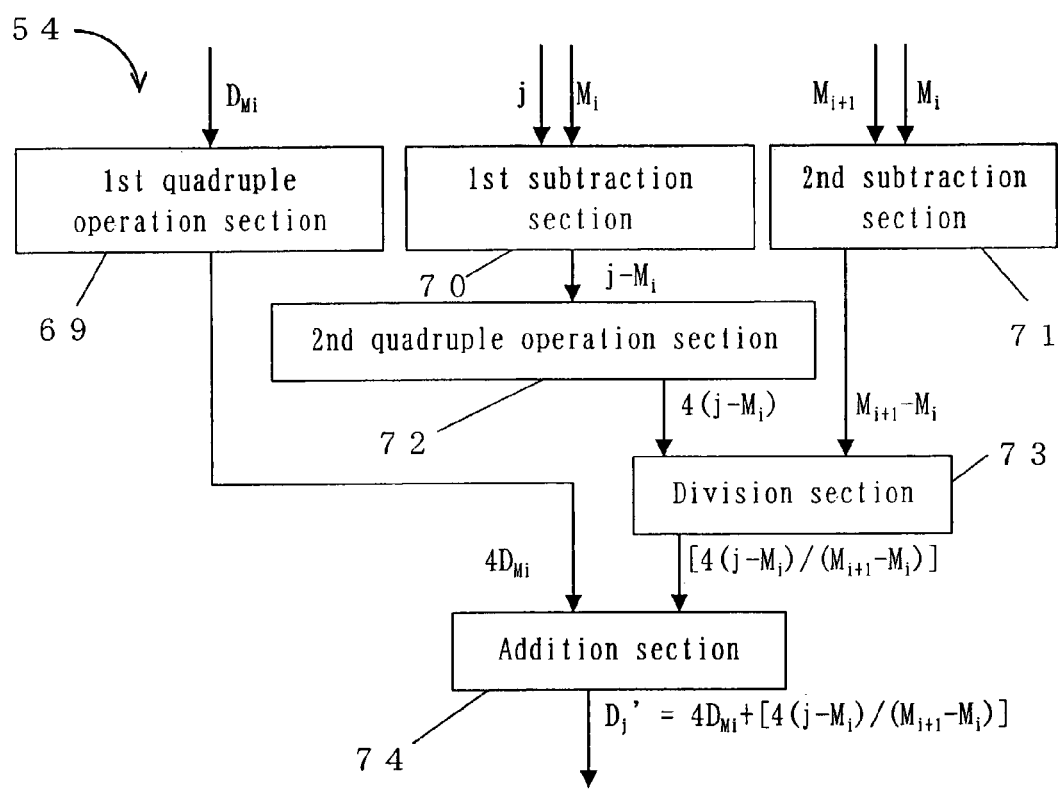
FIG. 4 is a block diagram of a signal expansion section of the image processing apparatus in the first example.

The structure of the signal expansion section 54 will be described in more detail with reference to FIG. 4.

The signal expansion section 54 includes a first quadruple operation section 69, a first subtraction section 70, a second subtraction section 71, a second quadruple operation section 72, a division section 73, and an addition section 74.

The first quadruple operation section 69 includes a 2-bit shift circuit, and quadruples the value of an input signal using the 2-bit shift circuit.

The first subtraction section 70 and the second subtraction section 71 each include a subtraction circuit, and perform a subtraction of the value of an input signal using the subtraction circuit.

The second quadruple operation section 72 includes a 2-bit shift circuit, and quadruples the value of an input signal using the 2-bit shift circuit.

The division section 73 includes a division circuit, and performs a division of the value of an input signal using the division circuit.

The addition section 74 includes an addition circuit, and performs an addition of the value of an input signal using the addition circuit.

Figure 5:
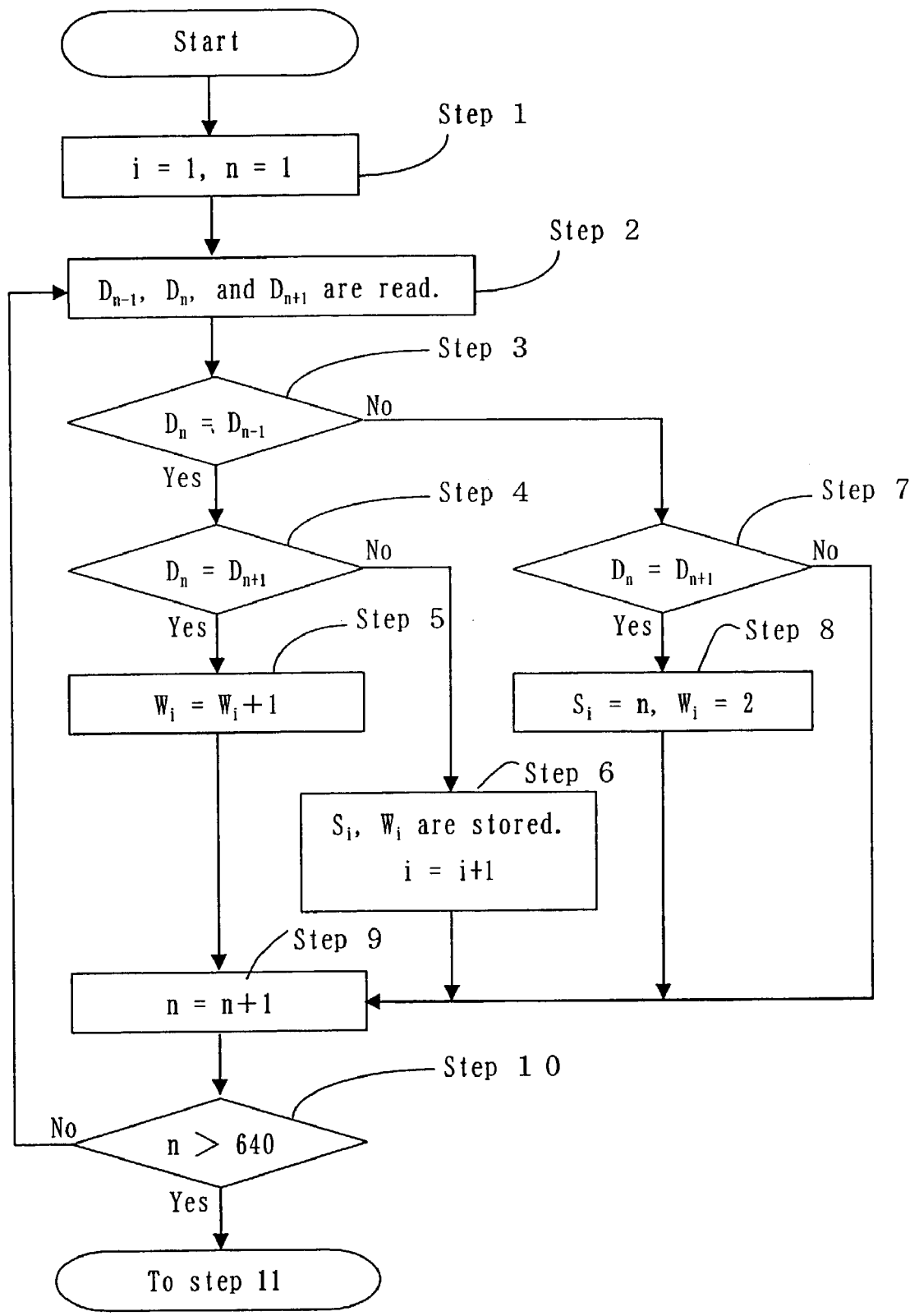
FIG. 5 is a flowchart illustrating a first half of the fundamental algorithm of processing performed by the detection section and the signal expansion section of the image processing apparatus in the first example.
Figure 6:
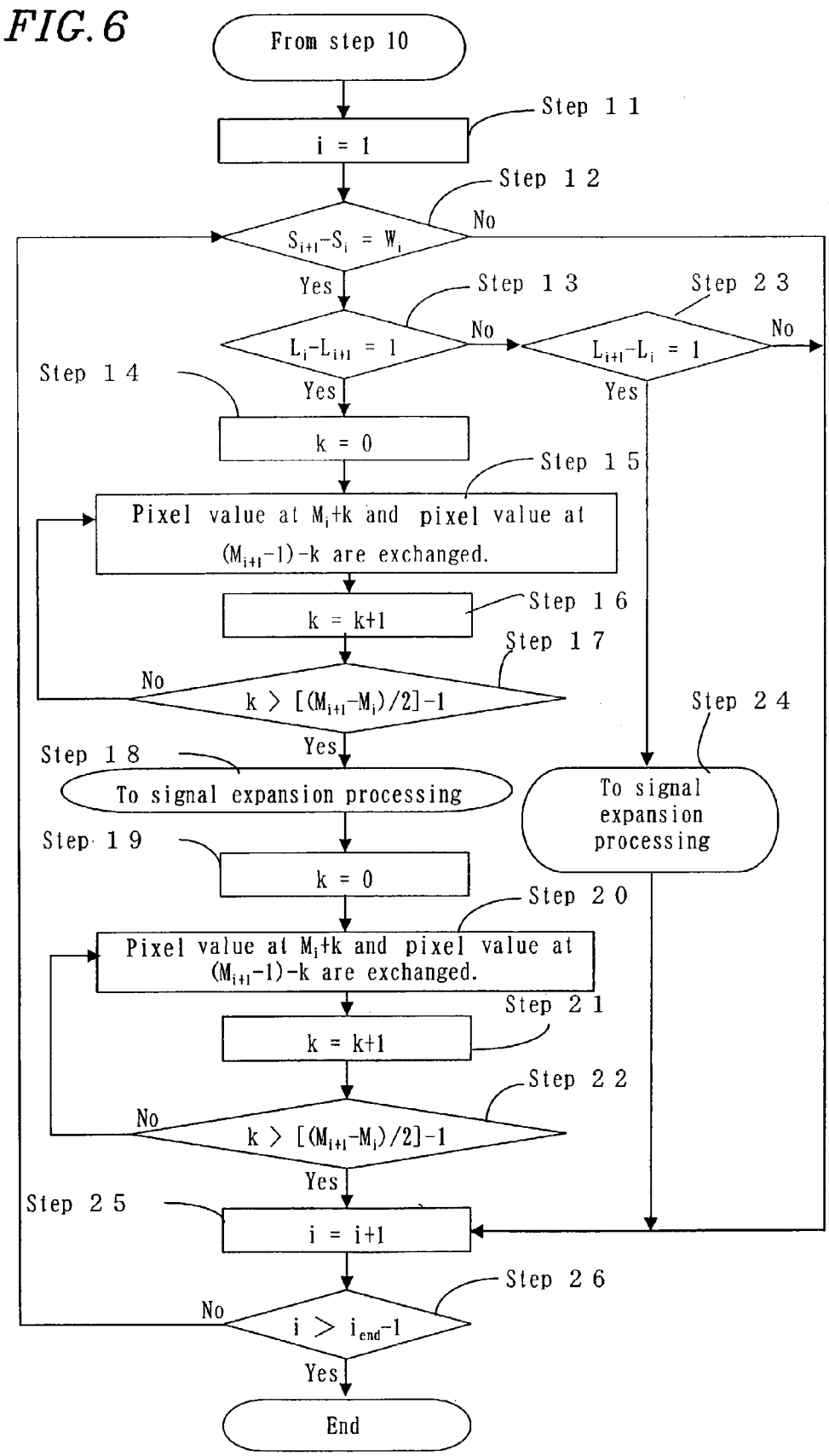
FIG. 6 is a flowchart illustrating a second half of the fundamental algorithm of processing performed by the detection section and the signal expansion section of the image processing apparatus in the first example.

With reference to FIGS. 5 and 6, the fundamental algorithm of processing performed by the detection section 53 and the signal expansion section 54 will be described. FIG. 5 illustrates the first half of the processing of the detection section 53 and the signal expansion section 54. FIG. 6 illustrates the second half of the processing of the detection section 53 and the signal expansion section 54. In FIGS. 5 and 6, "n" represents the number assigned to each pixel of each line in the order of the positions of the pixels. In the first example, 640 pixels are arranged in each line, and "n" is a natural number in the range of 1 through 640. The pixel values of pixels of each line are represented by $D_1, D_2, \ldots D_{640}$ in correspondence with the values of "n". "i" is assigned to each pixel in a series of two or more adjacent pixels having the same pixel value ($1 \leq i < n$). The values of "i" are assigned sequentially from one end of the series of pixels. $S_i$ is the value representing the position of the first pixel among the series of pixels, and $W_i$ represents the number of pixels in the series of pixels. For example, when the pixel values $D_1=D_2=D_3$ and $D_4=D_5$, $S_1=1$, $W_1=3$, $S_2=4$, and $W_2=2$.

The processing of the detection section 53 and the signal expansion section 54 is performed as follows.

Referring to FIG. 5, in step 1, i=1 and n=1 are set.

In step 2, image data $D_{n-1}$, $D_n$, and $D_{n+1}$ are read by the pixel value comparison section 61.

In step 3, the pixel values of image data (pixel) $D_n$ and image data $D_{n-1}$ (which is immediately preceding $D_n$) are compared to each other by the pixel value comparison section 61.

When the comparison result of the pixel value comparison section 61 in step 3 shows that image data $D_n$ and image data $D_{n-1}$ have the same pixel value, the processing advances to step 4, where the pixel values of image data $D_n$ and image data $D_{n+1}$ (which is immediately succeeding $D_n$) are compared to each other by the pixel value comparison section 61.

When the comparison result of the pixel value comparison section 61 in step 3 shows that image data $D_n$ and image data $D_{n-1}$ do not have the same pixel value, the processing advances to step 7, where the pixel values of image data $D_n$ and image data $D_{n+1}$ are compared to each other by the pixel value comparison section 61.

When the comparison result of the pixel value comparison section 61 in step 4 shows that image data $D_n$ and image data $D_{n+1}$ have the same pixel value, image data $D_{n-1}$, $D_n$ and $D_{n+1}$ all have the same pixel value. The processing advances to step 5, where the width count section 62 adds +1 to the width $W_i$ stored in the width memory section 64, and the processing advances to step 9.

When the comparison result of the pixel value comparison section 61 in step 4 shows that image data $D_n$ and image data $D_{n+1}$ do not have the same pixel value, image data $D_{n-1}$ and $D_n$ have the same pixel value but image data $D_n$ and $D_{n+1}$ do not have the same pixel value. This indicates that the series of pixels having the same pixel value is terminated at data Dn. Therefore, $S_i$ and $W_i$ are stored in the pixel position memory section 63 and the width memory section 64 respectively, and i is updated to i+1.

When the comparison result of the pixel value comparison section 61 in step 3 shows that image data $D_n$ and image data $D_{n-1}$ do not have the same pixel value, and the comparison result of the pixel value comparison section 61 in step 7 shows that image data $D_n$ and image data $D_{n+1}$ have the same pixel value, the pixel corresponding to image data $D_n$ is the first pixel of the series of pixels having the same pixel value. Therefore, $S_i$=n is stored in the pixel position memory section 63 and $W_i$=2 is stored in the width memory section 64. The processing advances to step 9.

When the comparison result of the pixel value comparison section 61 in step 7 shows that image data $D_n$ and image data $D_{n+1}$ do not have the same pixel value, image data $D_{n-1}$, $D_n$ and $D_{n+1}$ all have different pixel values, namely, there is no series of pixels having the same pixel value in this portion. Therefore, the processing advances to step 9 without storing any data in the pixel position memory section 63 or the width memory section 64.

In step 9, n is updated to (n+1). In step 10, it is determined whether or not the n exceeds 640. When n does not exceed 640, the processing returns to step 2, and the processing of steps 2 through 10 is performed for (n+1). When n exceeds 640, the processing advances to step 11 (FIG. 6).

In this manner, the above-described processing is performed for all the values of n (0 through 640).

In the processing shown in FIG. 6, the value $S_i$ (the value representing the position of the first pixel of the series of pixels) and $W_i$ (the value representing the number of pixels of the series of pixels), which are stored in the processing shown in FIG. 5, are used to determine whether the signal should be expanded or not and expands the signal when necessary. In the following description, $L_i$ represents the pixel value of the first pixel (at $S_i$) of the series of pixels. $L_i$ is defined as a first pixel value, and $L_{i+1}$ is defined as a second pixel value.

The pixel position value at the center between $S_i$ and $S_i+W_i$ is $M_i$, and the pixel position value at the center between $S_{i+1}$ and $S_{i+1}+W_{i+1}$ is $M_{i+1}$. More accurately, $M_i$ and $M_{i+1}$ are respectively the pixel position values represented by $M_i=S_i+[W_i/2]$ and $M_{i+1}=S_{i+1}+[W_{i+1}/2]$. "[ ]" is the Gauss symbol, and [a] represents the maximum integer not exceeding the value a.

First, in step 11, i=1 is set.

In step 12, it is determined by the first determination section 65 whether or not $S_{i+1}-S_i=W_i$. When it is determined that $S_{i+1}-S_i=W_i$, the processing advances to step 13. When it is not determined that $S_{i+1}-S_i=W_i$, the processing advances to step 25.

In step 13, it is determined by the second determination section 66 whether or not $L_i-L_{i+1}=1$. When it is determined that $L_i-L_{i+1}=1$, the processing advances to step 14. When it is not determined that $L_i-L_{i+1}=1$, the processing advances to step 23.

In step 23, it is determined by the third determination section 67 whether or not $L_{i+1}-L_i=1$. When it is determined that $L_{i+1}-L_i=1$, the processing advances to step 24, where the signal expansion section 54 performs signal expansion. When it is not determined that $L_{i+1}-L_i=1$, the processing advances to step 25.

In step 14, k=0 is set. k is an integer which is represented by 0 through $[(M_{i+1}-M_i)/2]-1$.

Next, in step 15, the pixel value of pixel position value $(M_i+k)$ and the pixel value of pixel position value $((M_{i+1}-1)-k))$ are exchanged with each other by the signal exchange section 68. When the processing of step 15 is finished, the processing advances to step 16, where k is updated to (k+1).

Then, the processing advances to step 17. It is determined whether or not the updated k, that is, (k+1) exceeds $[(M_{i+1}-M_i)/2]-1$. When (k+1) does not exceed $[(M_{i+1}-M_i)/2]-1$, the processing returns to step 15, and the processing of step 15 is performed for (k+1). When (k+1) exceeds $[(M_{i+1}-M_i)/2]-1$ in step 17, the processing advances to step 18.

Thus, the above-described processing is performed for all the values of k (0 through $[(M_{i+1}-M_i)/2]-1$).

When the processing of step 17 is finished, the processing advances to step 18, where the signal expansion section 54 performs signal expansion.

When the processing of step 18 is finished, the processing advances to step 19, where k=0 is set. k is an integer represented by 0 through $[(M_{i+1}-M_i)/2]-1$.

Next, in step 20, the pixel value of pixel position value $(M_i+k)$ and the pixel value of pixel position value $((M_{i+1}-1)-k))$ are exchanged with each other. When the processing of step 20 is finished, the processing advances to step 21, where k is updated to (k+1).

Then, the processing advances to step 22. It is determined whether or not the updated k, that is, (k+1) exceeds $[(M_{i+1}-M_i)/2]-1$. When (k+1) does not exceed $[(M_{i+1}-M_i)/2]-1$, the processing returns to step 20, and the processing of step 20 is performed for (k+1). When (k+1) exceeds $[(M_{i+1}-M_i)/2]-1$ in step 22, the processing advances to step 25.

Thus, the above-described processing is performed for all the values of k (0 through $[(M_{i+1}-M_i)/2]-1$).

In step 25, i is updated to (i+1).

In step 26, it is determined whether or not the updated i, that is, (i+1) exceeds $i_{end}-1$. $i_{end}$ represents the maximum value of i which is set in the processing of FIG. 5. When (i+1) does not exceed $i_{end}-1$, the processing returns to step 12, wherein the processing of steps 12 through 26 is performed for (i+1). When (i+1) exceeds $i_{end}-1$, the processing of the detection section 53 and the signal expansion section 54 is terminated.

In this manner, the above-described processing is performed for all the values of i (1 through $i_{end}-1$).

The processing shown in FIG. 6 performed by the detection section 53 and the signal expansion section 54 will be described in more detail.

The value $S_i$ representing the position of the first pixel of the series of pixels, and $W_i$ (width or the number of pixels of the series of pixels) (i=1, 2, . . . , $i_{end}$), are stored by the processing shown in FIG. 5. In the processing shown in FIG. 6, signal expansion is performed only when $S_{i+1}-S_i=W_i$ and $L_i-L_{i+1}=1$ or when $S_{i+1}-S_i=W_i$ and $L_{i+1}-L_i=1$ (low frequency portion). Signal expansion is not performed when the difference between $L_i$ and $L_{i+1}$ is ±2 or more (high frequency portion). Actual signal expansion is performed for the pixels at $M_i$ through ($M_{i+1}-1$), as described below.

When $S_{i+1}-S_i=W_i$ and $L_{i+1}-L_i=1$, signal expansion is performed by the signal expansion section 54. When $S_{i+1}-S_i=W_i$ and $L_i-L_{i+1}=1$, the data of the pixels at $M_i$ through ($M_{i+1}-1$) is symmetrically exchanged as follows. The image data at $M_i$ and the image data at ($M_{i+1}-1$) are exchanged. The image data at ($M_i+1$) and the image data at ($M_{i+1}-2$) are exchanged. The image data at ($M_i+2$) and the image data at ($M_{i+1}-3$) are exchanged. Such data exchange is continued until the image data ($M_i+[(M_{i+1}-M_i)/2]-1$) and the image data at ($M_{i+1}-[(M_{i+1}-M_i)/2]$) are exchanged. After that, signal expansion is performed. After the signal expansion is finished, data exchange is again performed so as to return the image data. The data exchange is performed so that similar signal expansion can be performed regardless of whether the pixel value of the first group of pixels is larger or smaller than the pixel value of the second group of pixels.

Figure 7:
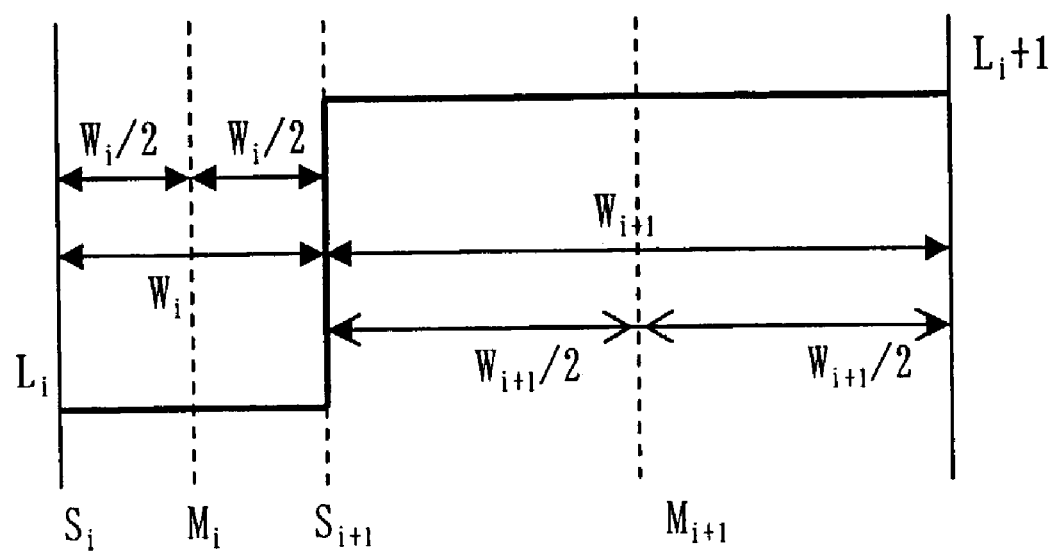
FIG. 7 schematically shows a portion of an image signal which is a target of signal expansion performed by the signal expansion section of the image processing apparatus in the first example, but is before the signal expansion.

FIG. 7 is a schematic view of an exemplary signal portion which is a target of signal expansion. The signal shown in FIG. 7 has not yet been processed by signal expansion.

Figure 8:
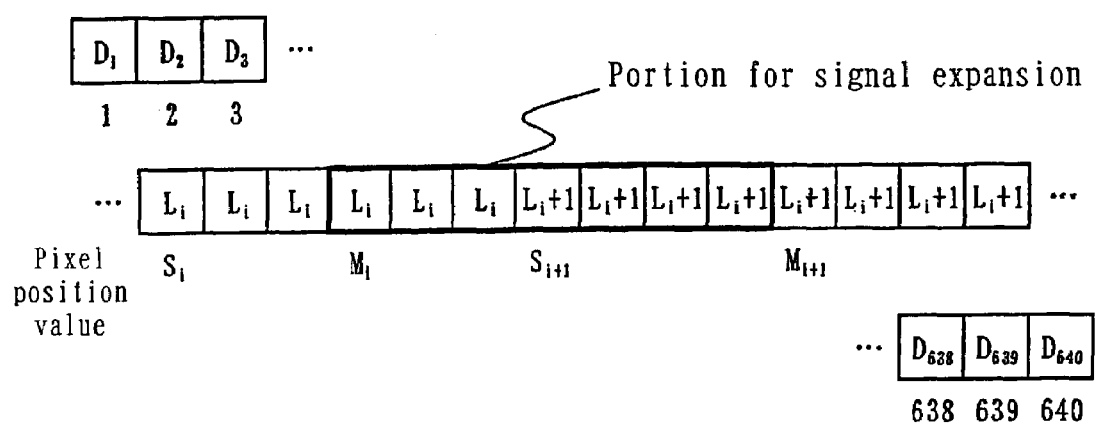
FIG. 8 schematically shows image data of an image signal stored in a line memory in the image processing apparatus in the first example.

In the example shown in FIG. 7, pixels having pixel value $L_i$ represented by 6 bits are continued for $W_i$ from the start position value $S_i$, and then pixels having pixel value $L_{i+1}$ ($L_i+1$) represented by 6 bits are continued for $W_{i+1}$ from the start position value $S_{i+1}$ ($=S_i+W_i$). The line memory 52 stores such pixels in a line as shown in FIG. 8.

Figure 9:
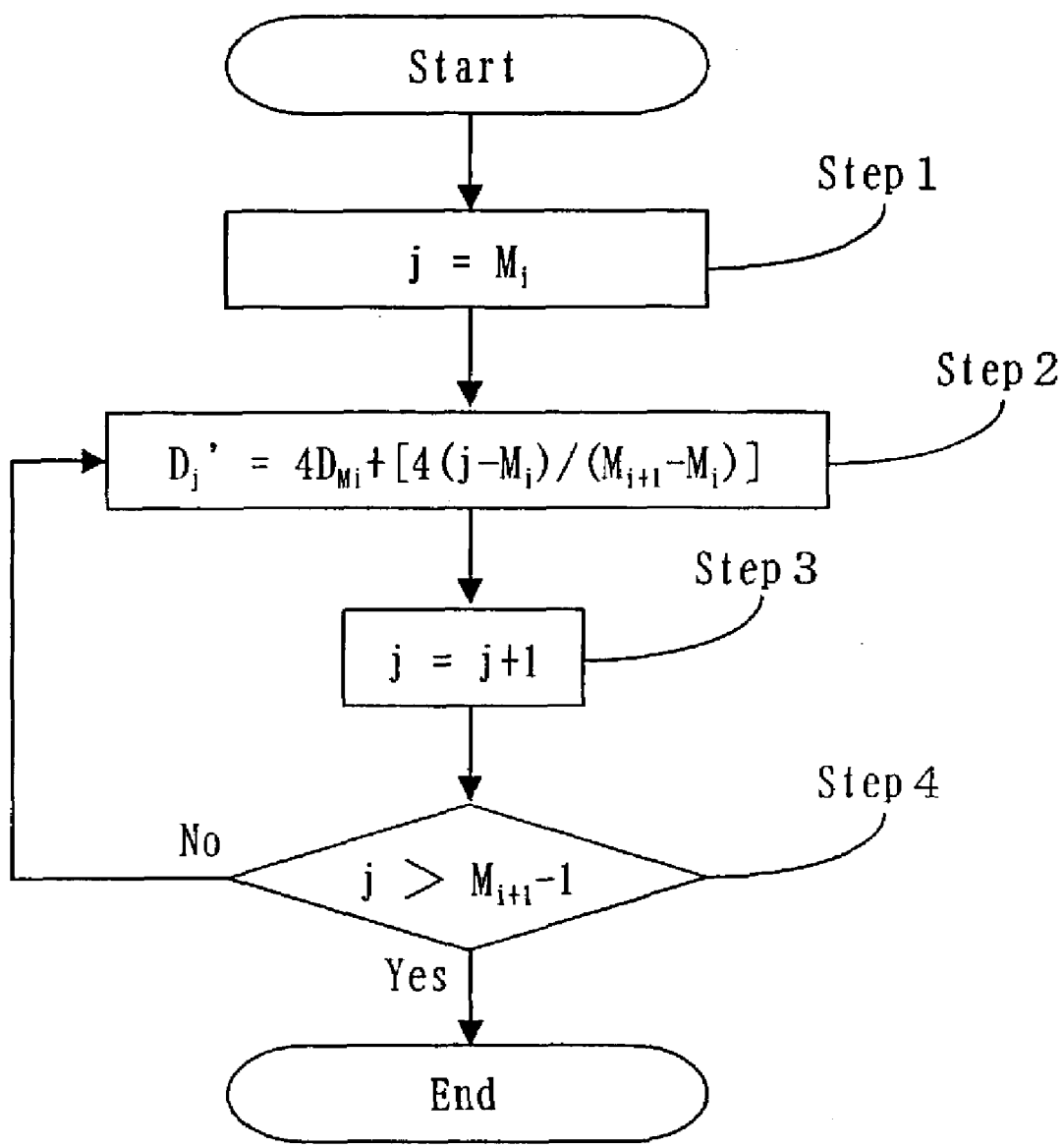
FIG. 9 is a flowchart illustrating the fundamental algorithm of processing performed by the signal expansion section of the image processing apparatus in the first example.

Next, signal expansion performed by the signal expansion section 54 will be described with reference to FIGS. 4 and 9. FIG. 9 is a flowchart illustrating the algorithm of signal expansion performed by the signal expansion section 54.

Figure 10:
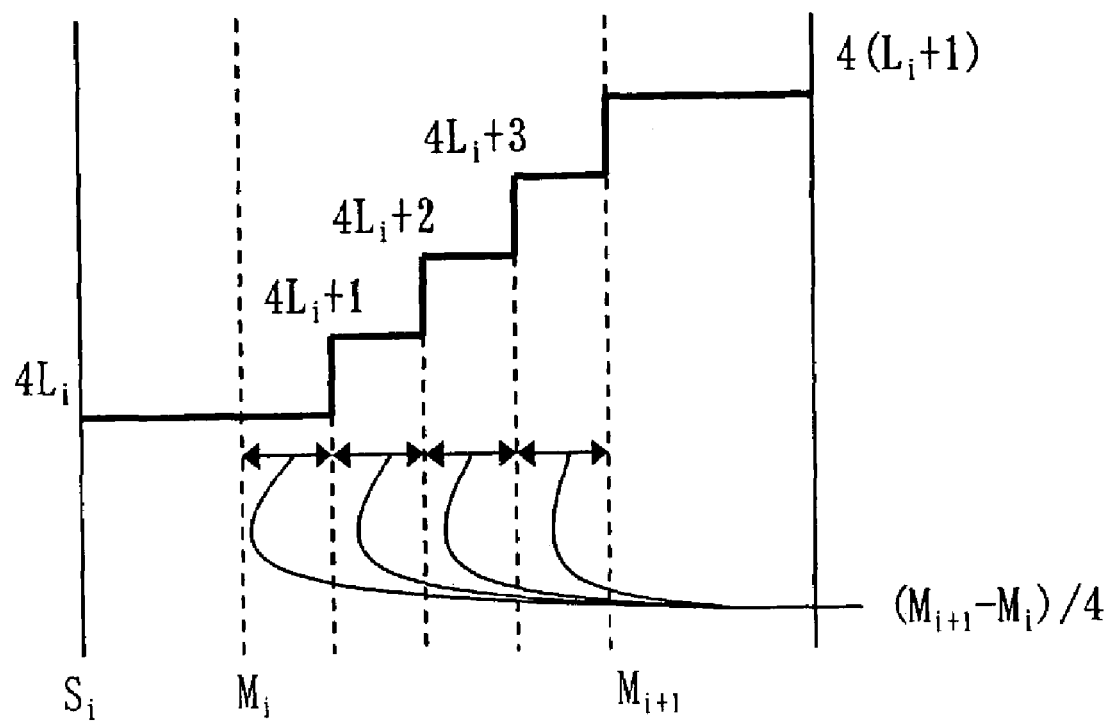
FIG. 10 schematically shows an exemplary image signal obtained by the signal expansion performed by the signal expansion section of the image processing apparatus in the first example.

The signal expansion performed by the signal expansion section 54 expands a pixel value represented by 6 bits into a pixel value represented by 8 bits. Specifically, the signal expansion section 54 is performed as follows. Pixel values $L_i$ and $L_i+1$ ($L_1=0$ through 63) of 6-bit data are respectively $4L_i$ and $4(L_i+1)$ ($4L_i=0$ through 255) in the 8-bit representation. The signal expansion is performed such that the pixels at $M_i$ through ($S_{i+1}-1$) having the pixel value $4L_i$, and the pixels at $S_{i+1}$ through $M_{i+1}-1$ having the pixel value $4(L_i+1)$, obtains the pixel values $4L_i$, $4L_i+1$, $4L_i+2$ and $4L_i+3$ (which are pixel value of 8-bit data). The pixel values should be changed from $4L_i$ to $4L_i+1$ to $4L_i+2$ and to $4L_i+3$ by $[(M_{i+1}-M_i)/4]$ pixels. In order to provide the above-mentioned pixels with the above-mentioned pixel values, 2 lowest bits are added to the 6-bit signals so as to expand the 6-bit signals into 8-bit signals. Owing to such signal expansion, the stepwise change from $L_i$ to $L_i+1$ due to the insufficient number of bits is changed to the smooth and linear gradation change as shown in FIG. 10.

Now, with reference to FIGS. 4 and 9, the processing of the signal expansion section 54 will be described. In the following description, $D_j$ represents the 6-bit pixel value at pixel position value j, and $D_j'$ represents the 8-bit pixel value at pixel position value j after signal expansion.

Referring to FIG. 9, in step 1, $j=M_i$ is set.

In step 2, signal expansion is performed for 6-bit image data $D_j$ at pixel position value j, so as to obtain 8-bit expanded image data $D_j'$.

The processing of step 2 performed by the signal expansion section 54 will be described also with reference to FIG. 4.

The first quadruple operation section 69 receives and quadruples image data $D_{Mi}$ at pixel position value $M_i$. The first subtraction section 70 receives pixel position values j and $M_i$ and performs a subtraction to obtain ($j-M_i$). The second subtraction section 71 receives pixel position values $M_{i+1}$ and $M_i$ and performs a subtraction to obtain ($M_{i+1}-M_i$)

The value ($j-M_i$) obtained by the first subtraction section 70 is input to the second quadruple operation section 72. The second quadruple operation section 72 quadruples the value ($j-M_i$) to obtain $4(j-M_i)$.

The division section 73 receives $4(j-M_i)$ obtained by the second quadruple operation section 72 and the value ($M_{i+1}-M_i$) obtained by the second subtraction section 71. These values are processed with the division to obtain $[4(j-M_i)/(M_{i+1}-M_i)]$.

The addition section 74 receives $4D_{Mi}$ obtained by the first quadruple section 69 and the value $[4(j-M_i)/(M_{i+1}-M_i)]$ obtained by the division section 73, and adds them together to obtain an 8-bit expanded image signal $D_j'=4D_{Mi}+[4(j-M_i)/(M_{i+1}-M_i)]$. $D_{Mi}$ is the 6-bit pixel value at $M_i$. When no data exchange has been performed ($L_{i+1}-L_i=1$), $D_{Mi}=L_i$. When data exchange has been performed ($L_i-L_{i+1}=1$), $D_{Mi}=L_{i+1}$.

When the signal expansion by the signal expansion section 54 is finished, the processing-advances to step 3, where j is updated to j+1.

In step 4, it is determined whether or not the updated j, that is, (j+1) exceeds ($M_{i+1}-1$). When (j+1) does not exceed ($M_{i+1}-1$), the processing returns to step 2, where the processing of step 2 is performed for (j+1). When (j+1) exceeds ($M_{i+1}-1$), the signal expansion is terminated.

The image processing apparatus 43 according to the first example operates as follows. The detection section 53 detects an image pattern in which two or more pixels having the same pixel value L (L is an arbitrary integer of 0 through 63) are continuous and the two or more pixels are followed by two or more pixels having the same pixel value (L+1) or (L−1). The detection section 53 also stores the position value $S_i$ of the first pixel among the continuous pixels having the same pixel values, and the width (number of pixels) $W_i$ of the continuous pixels having the same pixel values. Using $S_i$ and $W_i$, the signal expansion section 54 expands the 6-bit image data to 8-bit image data. Therefore, the display capability of the liquid crystal panel 45 can be fully utilized. The problem of the conventional apparatus that the stepwise or discontinuous change of color tones occurs due to the insufficient number of bits is solved, and smooth and linear graduation change is provided.

As shown in FIG. 1, the image processing apparatus 43 in the first example is connected between the liquid crystal controller 41 and the liquid crystal driver 44. The image processing apparatus 43 maybe provided at another location, for example, in the liquid crystal controller 41.

When the image processing apparatus 43 is located in the liquid crystal controller 41, the image processing apparatus 43 and the signal processing section 41b may be formed of different circuits. Alternatively, the image processing apparatus 43 and the signal processing section 41b may be integrated into a one-chip microcomputer for realizing multi-purpose processing.

In such a case, the image processing programs described above with reference to FIGS. 5, 6 and 9 may be stored in the external memory 22 of the external host system 2, so that liquid crystal controller 41 can be controlled by the external host system 2 to execute the programs. Alternatively, the programs may be stored in a built-in memory in the liquid crystal controller 41 and/or the liquid crystal driver 44.

The liquid crystal display apparatus 1 described in the first example realizes a color image by combination of R, G and B pixels. The present invention is not limited to this, and an image processing apparatus is applicable to single-color liquid crystal display apparatuses. An image processing apparatus is applicable to, for example, ELDs (electroluminescence displays) or PDPs (plasma display panels).

In the first example, signal expansion is performed based on pixels adjacent in the horizontal direction (i.e., the direction in which image signals are sequentially transferred on an image display screen). In the case where a section for storing vertical lines such as a frame memory is provided, signal expansion can be performed based on pixels adjacent in the vertical direction (i.e., the direction vertical to the direction in which image signals are sequentially transferred on an image display screen). In the case where a section for storing image data which has been detected and expanded for each line is provided, signal expansion based on pixels adjacent in the horizontal direction, signal expansion based on pixels adjacent in the vertical direction, and signal expansion based on pixels adjacent an oblique line may be combined. The signal expansion may also be performed in a curved manner (for example, projecting upward or downward), instead of linearly. By performing signal processing based on pixels adjacent in multiple directions, more natural images having a higher degree of freedom can be provided.

EXAMPLE 2

In a second example of the present invention, an image processing apparatus for expanding a 6-bit digital image signal into a 10-bit digital image signal to be supplied to a liquid crystal panel will be described. The liquid crystal panel used in the second example has a display area of 1600 pixel (horizontal)×1200 pixels (vertical).

The liquid crystal display apparatus used in the second example has substantially the same structure as that of the liquid crystal display apparatus 1 (FIG. 1) used in the first example, and thus will not be described in detail.

It should be noted that the image processing apparatus according to the present invention is not limited to an apparatus for processing images to be supplied to a liquid crystal panel. The image processing apparatus according to the present invention is not limited to expanding a 6-bit digital image signal to a 10-bit digital image signal. The liquid crystal panel used with the image processing apparatus of the present invention is not limited to have a display area of 1600 pixels×1200 pixels. These are merely exemplary.

The image processing apparatus in the second example has a structure suitable for products demanded to provide higher quality images, for example, large-screen liquid crystal TVs and monitors.

Figure 11:
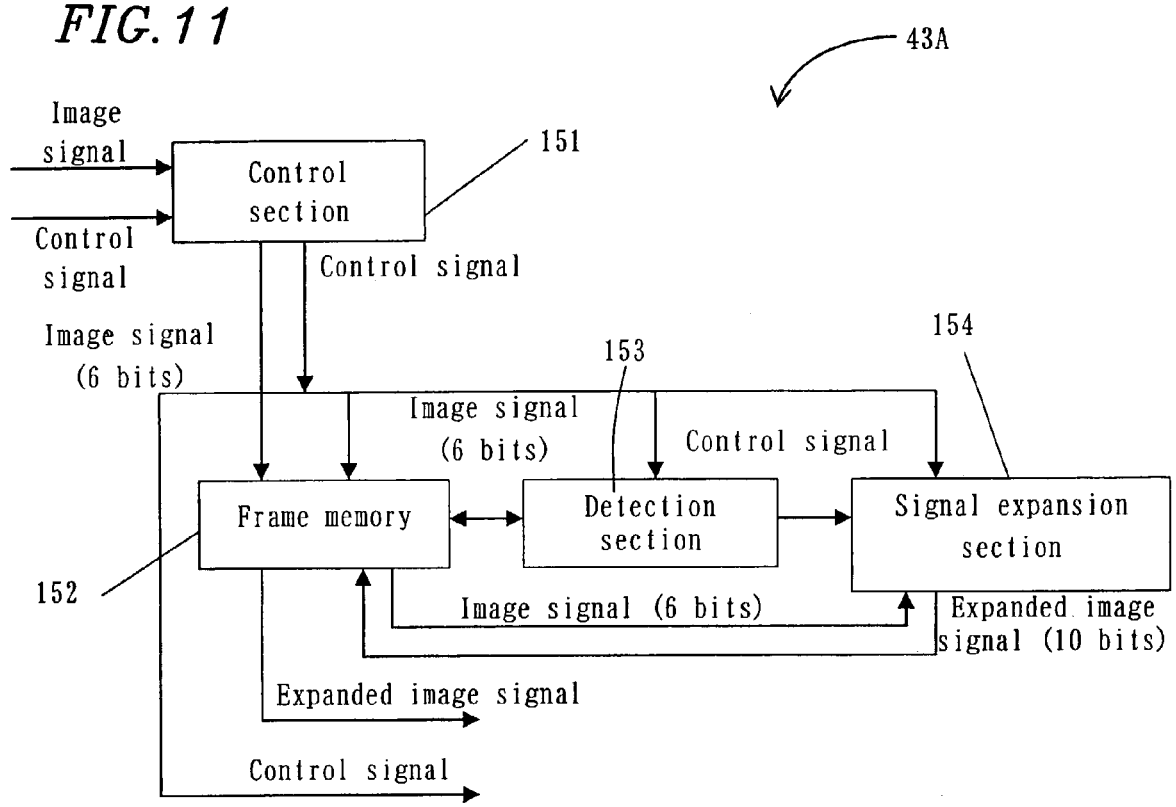
FIG. 11 is a block diagram of an image processing apparatus according to a second example of the present invention.

FIG. 11 is a block diagram illustrating a partial structure of an image processing apparatus 43A according to the second example.

The image processing apparatus 43A includes a control section 151, a frame memory 152, a detection section 153, and a signal expansion section 154.

The control section 151 receives a 6-bit signal and a control signal which are output from the liquid crystal controller 41 (FIG. 1). The control signal is output to each of the frame memory 152, the detection section 153, the signal expansion section 154, and the liquid crystal driver 44 (FIG. 1). The 6-bit image signal is output to a frame memory 152. The control section 151 controls the frame memory 152, the detection section 153, and the signal expansion section 154, such that image data processed by these sections are synchronized with the control signal when being output to the liquid crystal driver 44 (FIG. 1).

The frame memory 152 sequentially reads the 6-bit image signal from the control section 151 while synchronizing the 6-bit image signal to the control signal, frame by frame, i.e., in units of 1600×1200 pixels. The frame memory 152 also reads the 10-bit expanded image signal which is generated by the signal expansion section 154 and outputs the 10-bit expanded image signal to the liquid crystal driver 44 (FIG. 1) frame by frame.

The detection section 153 reads the 6-bit image signal which is output from the frame memory 152, and detects a portion of the image signal which is represented by stepwise or discontinuous gradation change, i.e., a pseudo profile. The pseudo profile is caused by insufficient number of bits of image signals, and deteriorates the image quality. Generally in an image, the pseudo profile is stepwise stripes of gradations.

More specifically, the detection section 153 performs the following operation regarding a 6-bit image signal. The detection section 153 detects an image pattern in which two or more pixels having the same pixel value L (L is an arbitrary integer of 0 through 63) are continuous and the two or more pixels are followed by two or more pixels having the same pixel value (L+1) or (L−1). The detection section 153 also stores the position value of the first pixel among the continuous pixels having the same pixel values, and the width (number of pixels) of the continuous pixels having the same pixel values. The detection section 153 outputs the position value and the width value to the signal expansion section 154.

The signal expansion section 154 adds 4 lowest bits to the 6-bit image signal corresponding to pixels which are detected by the detection section 153 and are a target of the signal expansion, thereby generating a 10-bit image signal. The addition of 4 bits is performed as described later, such that the discontinuous portion of the image caused by the insufficient number of bits is eliminated and the smooth gradation change is realized. To the image signal corresponding to pixels which are not a target of the signal expansion, 4 lowest bits "0000" are added, thereby generating a 10-bit image signal. Thus, all the 6-bit image signals are expanded to 10-bit image signals. The 10-bit image signals expanded by the signal expansion section 154 are written to the frame memory 152.

The detection section 153 and the signal expansion section 154 perform the above-described processing for each of R, G and B pixels. Such signal expansion is performed for one frame, i.e., 1600×1200 pixels, and thus one image is displayed.

In the second example, when the difference between the pixel values of two adjacent pixel is 1 and it is detected that two or more pixels having the same pixel values are continuous, signal expansion is performed. The present invention is not limited to this, and threshold values such as the difference between the pixel values of two adjacent pixel and the number of continuous pixels for signal expansion can be freely set.

Figure 12:
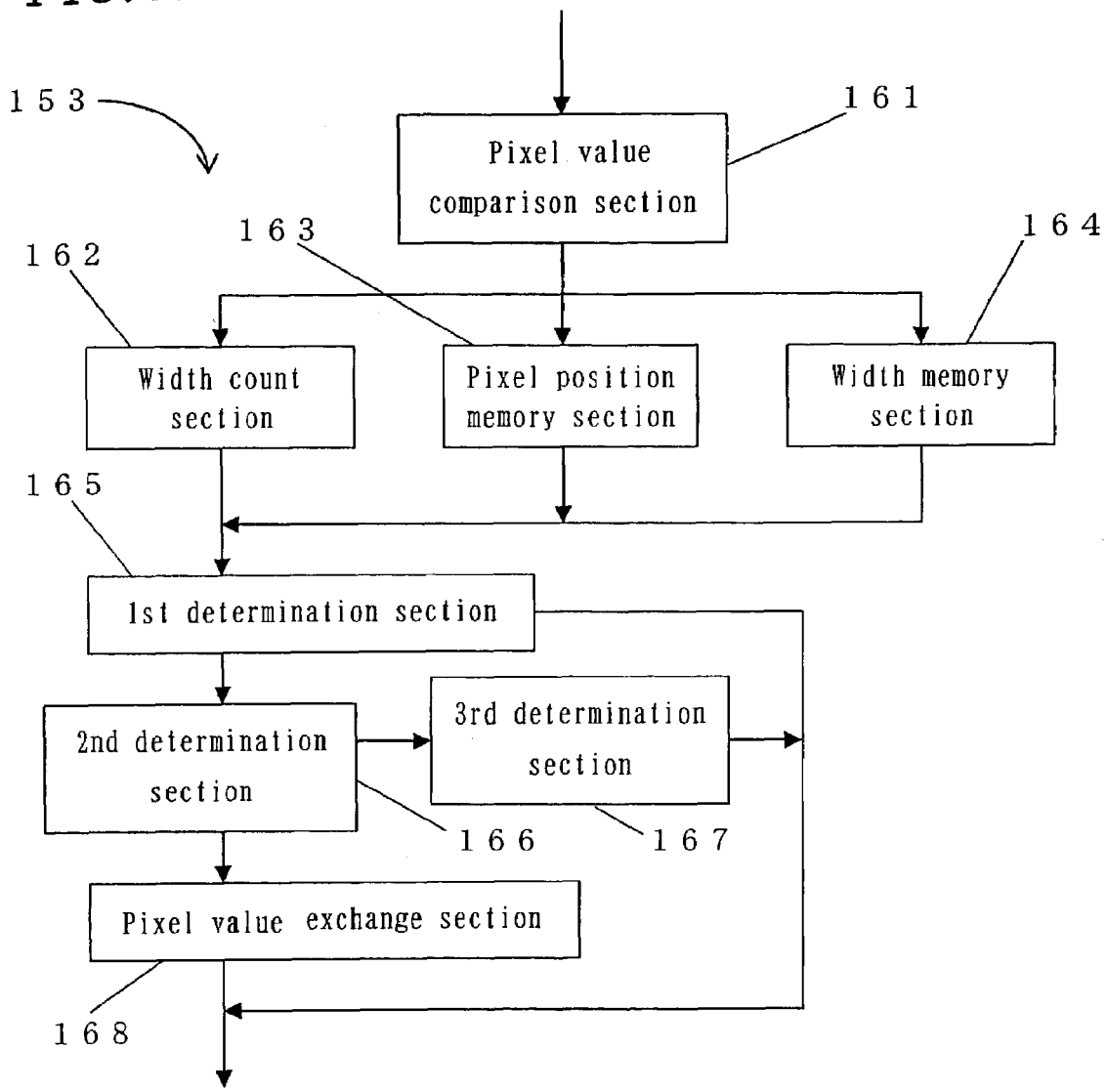
FIG. 12 is a block diagram of a detection section of the image processing apparatus in the second example.

Next, the structure of the detection section 153 will be described in more detail with reference to FIG. 12.

The detection section 153 includes a pixel value comparison section 161, a width count section 162, a pixel position memory section 163, a width memory section 164, first through third determination sections 165 through 167, and a pixel value exchange section 168.

The pixel value comparison section 161 is connected to the frame memory 152 (FIG. 11) and compares whether the pixel values of adjacent pixels which are read from the frame memory 152 are equal to each other or not.

The width count section 162 is connected to the pixel value comparison section 161. When the comparison result of the pixel value comparison section 161 shows that the pixel values of the adjacent pixels are equal to each other (i.e., the pixels having the same pixel value are continuous), the width count section 162 adds "1" to the width of the image data.

The pixel position memory section 163 is connected to the pixel value comparison section 161. When the comparison result of the pixel value comparison section 161 shows that the pixel values of the adjacent pixels are equal to each other (i.e., the pixels having the same pixel value are continuous), the pixel position memory section 163 stores the value representing the position of the first pixel among the continuous pixels.

The width memory section 164 is connected to the pixel value comparison section 161. When the comparison result of the pixel value comparison section 161 shows that a first series of pixels having the same pixel value is terminated, the width memory section 164 stores the width of the pixels having the same pixel value (number of pixels).

The first determination section 165 is connected to the width count section 162, the pixel position memory section 163, and the width memory section 164. The first determination section 165 determines whether or not the difference between (i) the value representing the position of the first pixel of the first series of pixels having the same pixel value (stored by the pixel position memory section 163) and (ii) the value representing the position of the first pixel of the next (second) series of pixels having the same pixel value is equal to the width stored by the width memory section 164.

The second determination section 166 is connected to the first determination section 165. The second determination section 166 determines whether or not the pixel value of the first series of pixels having the same pixel values is larger by 1 than the pixel value of the second series of pixels having the same pixel values.

The third determination section 167 is connected to the second determination section 166. The third determination section 167 determines whether or not the pixel value of the first series of pixels having the same pixel values is smaller by 1 than the pixel value of the second series of pixels having the same pixel values.

When the determination result of the first determination section 165 is "equal" and the determination result of the second determination section 166 is "larger by 1", the signal exchange section 168 connected to the second determination section 166 symmetrically exchanges the image data in the frame memory 152 to be processed by signal expansion.

Figure 13:
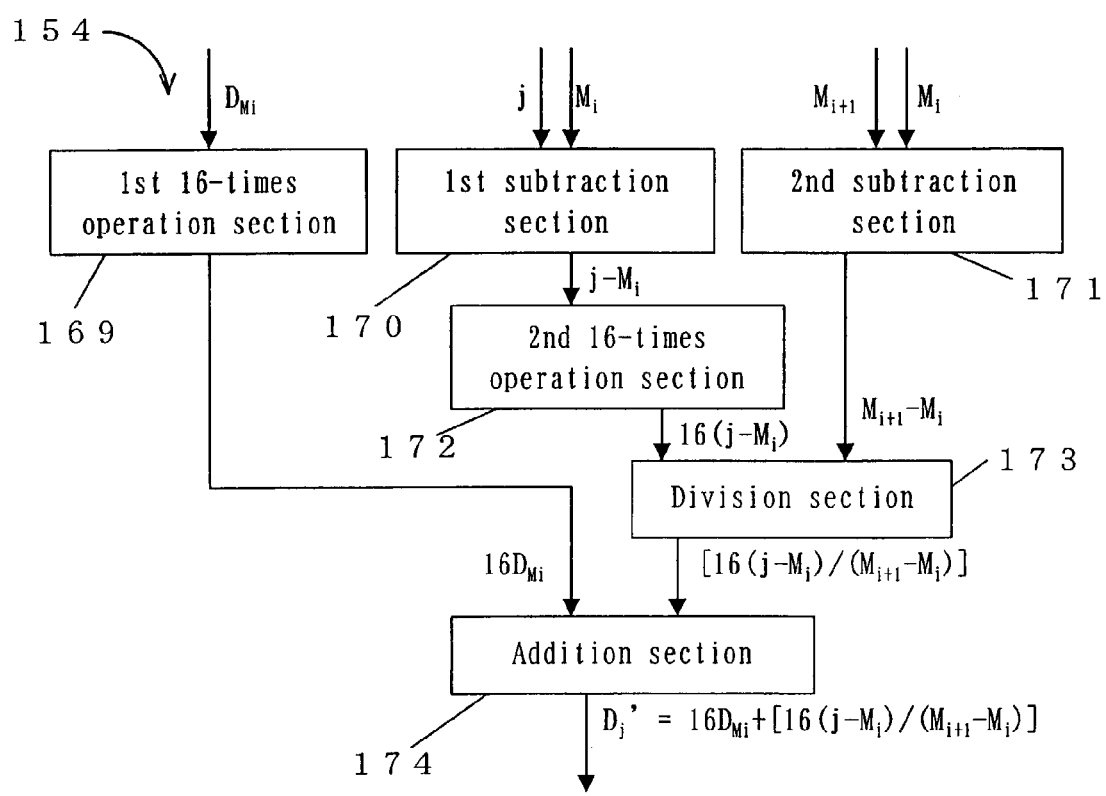
FIG. 13 is a block diagram of a signal expansion section of the image processing apparatus in the second example.

The structure of the signal expansion section 154 will be described in more detail with reference to FIG. 13.

The signal expansion section 154 includes a first 16-times operation section 169, a first subtraction section 170, a second subtraction section 171, a second 16-times operation section 172, a division section 173, and an addition section 174.

The first 16-times operation section 169 includes a 4-bit shift circuit, and multiplies the value of an input signal by 16 using the 4-bit shift circuit.

The first subtraction section 170 and the second subtraction section 171 each include a subtraction circuit, and perform a subtraction of the value of an input signal using the subtraction circuit.

The second 16-times operation section 172 includes a 4-bit shift circuit, and multiplies the value of an input signal by 16 using the 4-bit shift circuit.

The division section 173 includes a division circuit, and performs a division of the value of an input signal using the division circuit.

The addition section 174 includes an addition circuit, and performs an addition of the value of an input signal using the addition circuit.

Figure 14:
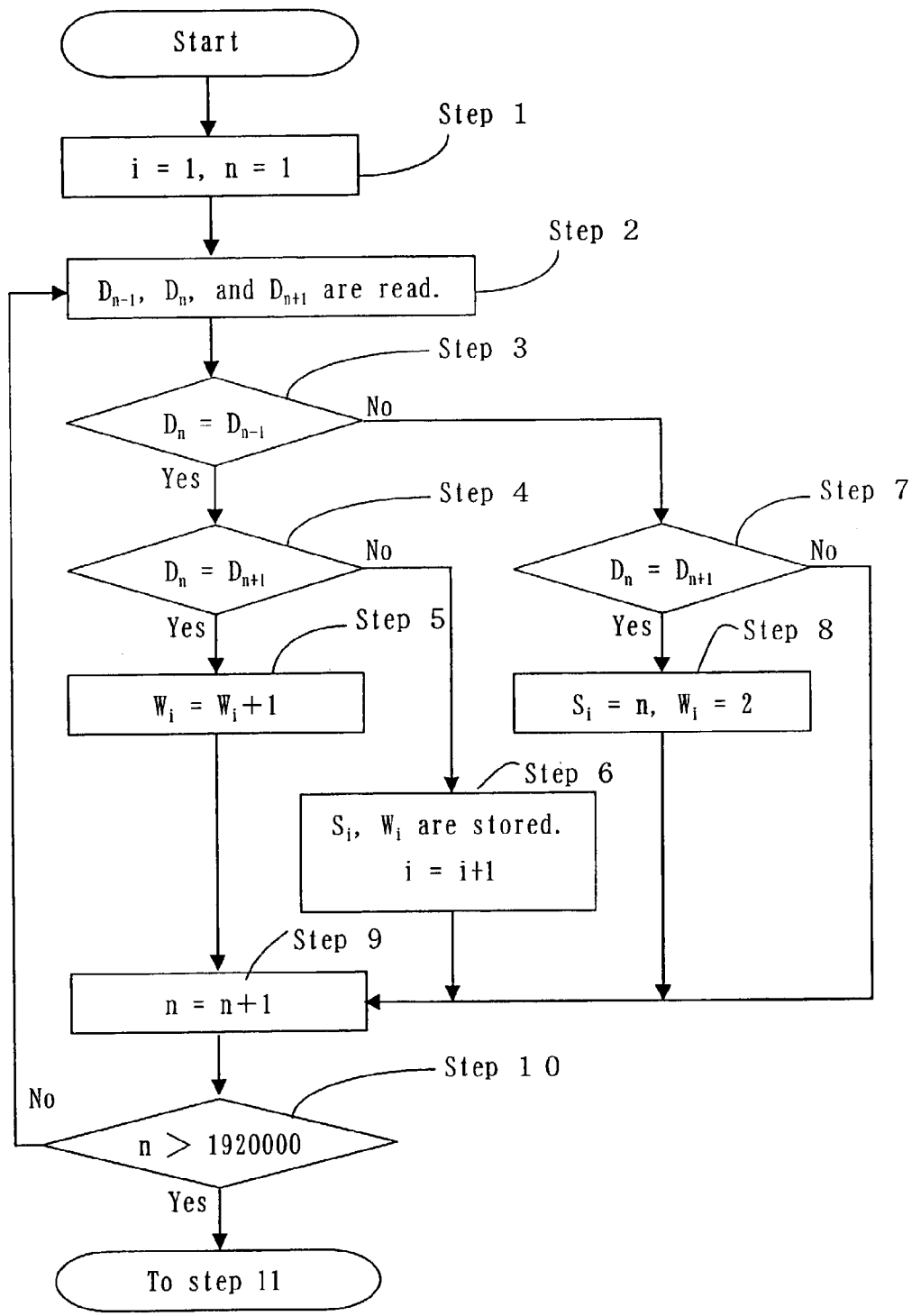
FIG. 14 is a flowchart illustrating a first half of the fundamental algorithm of processing performed by the detection section and the signal expansion section of the image processing apparatus in the second example.
Figure 15:
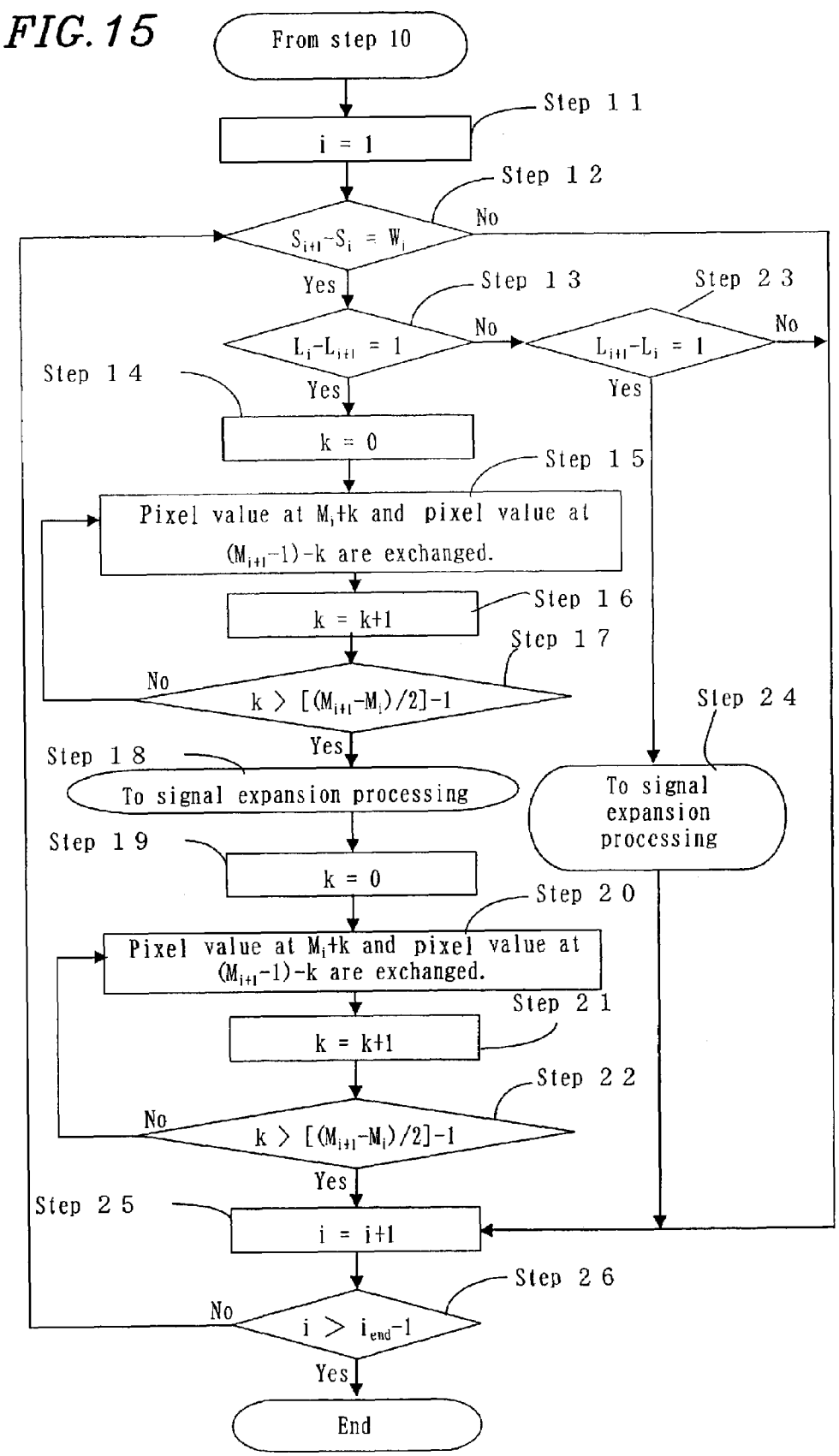
FIG. 15 is a flowchart illustrating a second half of the fundamental algorithm of processing performed by the detection section and the signal expansion section of the image processing apparatus in the second example.

With reference to FIGS. 14 and 15, the fundamental algorithm of processing performed by the detection section 153 and the signal expansion section 154 will be described. FIG. 14 illustrates the first half of the processing of the detection section 153 and the signal expansion section 154. FIG. 15 illustrates the second half of the processing of the detection section 153 and the signal expansion section 154. In FIGS. 14 and 15, "n" represents the number assigned to each pixel of each frame in the order of the positions of the pixels. In the second example, 1600×1200 pixels are arranged in each frame, and "n" is a natural number in the range of 1 through 1920000. The pixel values of pixels of each frame are represented by $D_1, D_2, \ldots D_{1920000}$ in correspondence with the values of "n". "i" is assigned to each pixel in a series of two or more pixels having the same pixel value ($1 \leq i < n$). The values of "i" are assigned sequentially from one end of the series of pixels. $S_i$ is the value representing the position of the first pixel among the series of pixels, and $W_i$ represents the number of pixels in the series of pixels. For example, when the pixel values $D_1=D_2=D_3$ and $D_4=D_5$, $S_1=1$, $W_1=3$, $S_2=4$, and $W_2=2$.

The processing of the detection section 153 and the signal expansion section 154 is performed as follows.

Referring to FIG. 14, in step 1, i=1 and n=1 are set.

In step 2, image data $D_{n-1}$, $D_n$, and $D_{n+1}$ are read by the pixel value comparison section 161.

In step 3, the pixel values of image data (pixel) $D_n$ and image data $D_{n-1}$ (which is immediately preceding $D_n$) are compared to each other by the pixel value comparison section 161.

When the comparison result of the pixel value comparison section 161 in step 3 shows that image data $D_n$ and image data $D_{n-1}$ have the same pixel value, the processing advances to step 4, where the pixel values of image data $D_n$ and image data $D_{n+1}$ (which is immediately succeeding $D_n$) are compared to each other by the pixel value comparison section 161.

When the comparison result of the pixel value comparison section 161 in step 3 shows that image data $D_n$ and image data $D_{n-1}$ do not have the same pixel value, the processing advances to step 7, where the pixel values of image data $D_n$ and image data $D_{n+1}$ are compared to each other by the pixel value comparison section 161.

When the comparison result of the pixel value comparison section 161 in step 4 shows that image data $D_n$ and image data $D_{n+1}$ have the same pixel value, image data $D_{n-1}$, $D_n$ and $D_{n+1}$ all have the same pixel value. The processing advances to step 5, where the width count section 162 adds +1 to the width $W_i$ stored in the width memory section 164, and the processing advances to step 9.

When the comparison result of the pixel value comparison section 161 in step 4 shows that image data $D_n$ and image data $D_{n+1}$ do not have the same pixel value, image data $D_{n-1}$ and $D_n$ have the same pixel value but image data $D_n$ and $D_{n+1}$ do not have the same pixel value. This indicates that the series of pixels having the same pixel value is terminated at data Dn. Therefore, $S_i$ and $W_i$ are stored in the pixel position memory section 163 and the width memory section 164 respectively, and i is updated to i+1.

When the comparison result of the pixel value comparison section 161 in step 3 shows that image data $D_n$ and image data $D_{n-1}$ do not have the same pixel value, and the comparison result of the pixel value comparison section 161 in step 7 shows that image data $D_n$ and image data $D_{n+1}$ have the same pixel value, the pixel corresponding to image data $D_n$ is the first pixel of the series of pixels having the same pixel value. Therefore, $S_i$=n is stored in the pixel position memory section 163 and $W_i$=2 is stored in the width memory section 164. The processing advances to step 9.

When the comparison result of the pixel value comparison section 161 in step 7 shows that image data $D_n$ and image data $D_{n+1}$ do not have the same pixel value, image data $D_{n-1}$, $D_n$ and $D_{n+1}$ all have different pixel values, namely, there is no series of pixels having the same pixel value in this portion. Therefore, the processing advances to step 9 without storing any data in the pixel position memory section 163 or the width memory section 164.

In step 9, n is updated to (n+1). In step 10, it is determined whether or not the n exceeds 1920000. When n does not exceed 1920000, the processing returns to step 2, and the processing of steps 2 through 10 is performed for (n+1). When n exceeds 1920000, the processing advances to step 11 (FIG. 15).

In this manner, the above-described processing is performed for all the values of n (0 through 1920000).

In the processing shown in FIG. 15, the value $S_i$ (the value representing the position of the first pixel of the series of pixels) and $W_i$ (the value representing the number of pixels of the series of pixels), which are stored in the processing shown in FIG. 14, are used to determine whether the signal should be expanded or not and expands the signal when necessary. In the following description, $L_i$ represents the pixel value of the first pixel (at $S_i$) of the series of pixels.

The pixel position value at the center between $S_i$ and $S_i+W_i$ is $M_i$, and the pixel position value at the center between $S_{i+1}$ and $S_{i+1}+W_{i+1}$ is $M_{i+1}$. More accurately, $M_i$ and $M_{i+1}$ are respectively the pixel position values represented by $M_i=S_i+[W_i/2]$ and $M_{i+1}=S_{i+1}+[W_{i+1}/2]$. "[ ]" is the Gauss symbol, and [a] represents the maximum integer not exceeding the value a.

First, in step 11, i=1 is set.

In step 12, it is determined by the first determination section 165 whether or not $S_{i+1}-S_i=W_i$. When it is determined that $S_{i+1}-S_i=W_i$, the processing advances to step 13. When it is not determined that $S_{i+1}-S_i=W_i$, the processing advances to step 25.

In step 13, it is determined by the second determination section 166 whether or not $L_i-L_{i+1}=1$. When it is determined that $L_i-L_{i+1}=1$, the processing advances to step 14. When it is not determined that $L_i-L_{i+1}=1$, the processing advances to step 23.

In step 23, it is determined by the third determination section 167 whether or not $L_{i+1}-L_i=1$. When it is determined that $L_{i+1}-L_i=1$, the processing advances to step 24, where the signal expansion section 154 performs signal expansion. When it is not determined that $L_{i+1}-L_i=1$, the processing advances to step 25.

In step 14, k=0 is set. k is an integer which is represented by 0 through $[(M_{i+1}-M_i)/2]-1$.

Next, in step 15, the pixel value of pixel position value $(M_i+k)$ and the pixel value of pixel position value $((M_{i+1}-1)-k))$ are exchanged with each other by the signal exchange section 168. When the processing of step 15 is finished, the processing advances to step 16, where k is updated to (k+1).

Then, the processing advances to step 17. It is determined whether or not the updated k, that is, (k+1) exceeds $[(M_{i+1}-M_i)/2]-1$. When (k+1) does not exceed $[(M_{i+1}-M_i)/2]-1$, the processing returns to step 15, and the processing of step 15 is performed for (k+1). When (k+1) exceeds $[(M_{i+1}-M_i)/2]-1$ in step 17, the processing advances to step 18.

Thus, the above-described processing is performed for all the values of k (0 through $[(M_{i+1}-M_i)/2]-1$).

When the processing of step 17 is finished, the processing advances to step 18, where the signal expansion section 154 performs signal expansion.

When the processing of step 18 is finished, the processing advances to step 19, where k=0 is set. k is an integer represented by 0 through $[(M_{i+1}-M_i)/2]-1$.

Next, in step 20, the pixel value of pixel position value $(M_i+k)$ and the pixel value of pixel position value $((M_{i+1}-1)-k))$ are exchanged with each other. When the processing of step 20 is finished, the processing advances to step 21, where k is updated to (k+1).

Then, the processing advances to step 22. It is determined whether or not the updated k, that is, (k+1) exceeds $[(M_{i+1}-M_i)/2]-1$. When (k+1) does not exceed $[(M_{i+1}-M_i)/2]-1$, the processing returns to step 20, and the processing of step 20 is performed for (k+1). When (k+1) exceeds $[(M_{i+1}-M_i)/2]-1$ in step 22, the processing advances to step 25.

Thus, the above-described processing is performed for all the values of k (0 through $[(M_{i+1}-M_i)/2]-1$).

In step 25, i is updated to (i+1).

In step 26, it is determined whether or not the updated i, that is, (i+1) exceeds $i_{end}-1$. $i_{end}$ represents the maximum value of i which is set in the processing of FIG. 14. When (i+1) does not exceed $i_{end}-1$, the processing returns to step 12, wherein the processing of steps 12 through 26 is performed for (i+1). When (i+1) exceeds $i_{end}-1$, the processing of the detection section 153 and the signal expansion section 154 is terminated.

In this manner, the above-described processing is performed for all the values of i (1 through $i_{end}-1$).

The processing shown in FIG. 15 performed by the detection section 153 and the signal expansion section 154 will be described in more detail.

The value $S_i$ representing the position of the first pixel of the series of pixels, and $W_i$ (width or the number of pixels of the series of pixels) (i=1, 2, ..., $i_{end}$), are stored by the processing shown in FIG. 14. In the processing shown in FIG. 15, signal expansion is performed only when $S_{i+1}-S_i=W_i$ and $L_i-L_{i+1}=1$ or when $S_{i+1}-S_i=W_i$ and $L_{i+1}-L_i=1$ (low frequency portion). Signal expansion is not performed when the difference between $L_i$ and $L_{i+1}$ is ±2 or more (high frequency portion). Actual signal expansion is performed for the pixels at $M_i$ through $(M_{i+1}-1)$, as described below.

When $S_{i+1}-S_i=W_i$ and $L_{i+1}-L_i=1$, signal expansion is performed by the signal expansion section 154. When $S_{i+1}-S_i=W_i$ and $L_i-L_{i+1}=1$, the data of the pixels at $M_i$ through $(M_{i+1}-1)$ is symmetrically exchanged as follows. The image data at $M_i$ and the image data at $(M_{i+1}-1)$ are exchanged. The image data at $(M_i+1)$ and the image data at $(M_{i+1}-2)$ are exchanged. The image data at $(M_i+2)$ and the image data at $(M_{i+1}-3)$ are exchanged. Such data exchange is continued until the image data $(M_i+[(M_{i+1}-M_i)/2]-1)$ and the image data at $(M_{i+1}-[(M_{i+1}-M_i)/2])$ are exchanged. After that, signal expansion is performed. After the signal expansion is finished, data exchange is again performed so as to return the image data. The data exchange is performed so that similar signal expansion can be performed regardless of whether the pixel value of the first group of pixels is larger or smaller than the pixel value of the second group of pixels.

Figure 16:
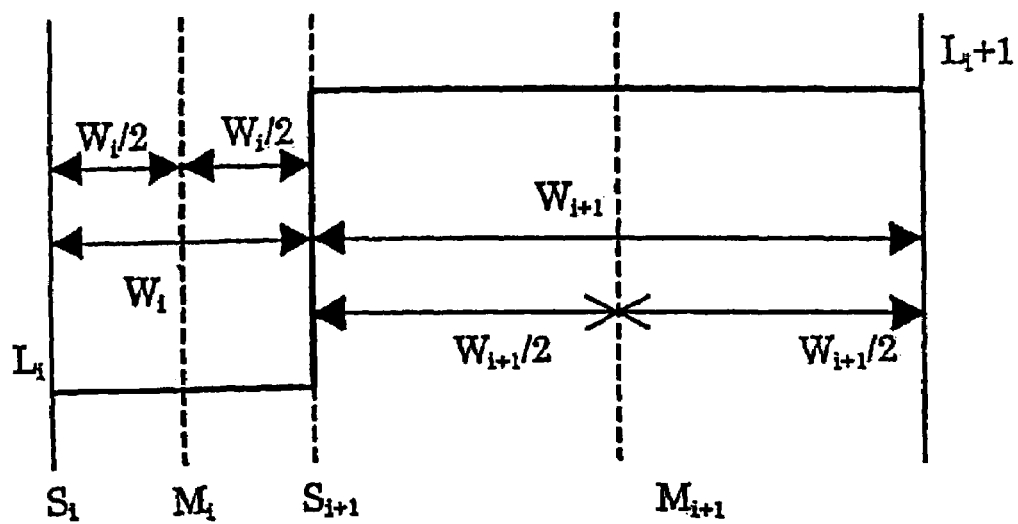
FIG. 16 schematically shows a portion of an image signal which is a target of signal expansion performed by the signal expansion section of the image processing apparatus in the second example, but is before the signal expansion.

FIG. 16 is a schematic view of an exemplary signal portion which is a target of signal expansion. The signal shown in FIG. 16 has not yet been processed by signal expansion.

Figure 17:
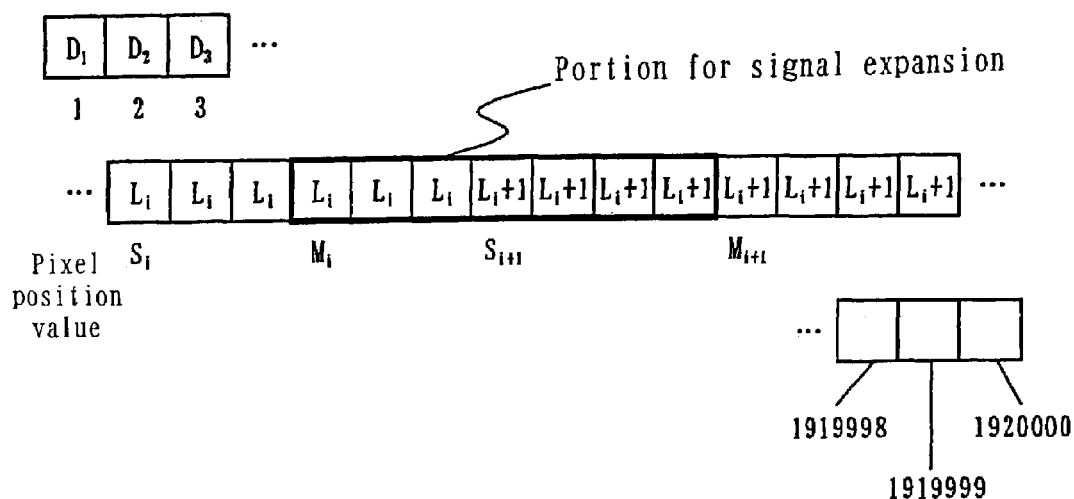
FIG. 17 schematically shows image data of an image signal stored in a frame memory in the image processing apparatus in the second example.

In the example shown in FIG. 16, pixels having pixel value $L_i$ represented by 6 bits are continued for $W_i$ from the start position value $S_i$, and then pixels having pixel value $L_{i+1}$ ($L_i+1$) represented by 6 bits are continued for $W_{i+1}$ from the start position value $S_{i+1}$ ($=S_i+W_i$). The frame memory 152 stores such pixels in a line as shown in FIG. 17.

Figure 19:
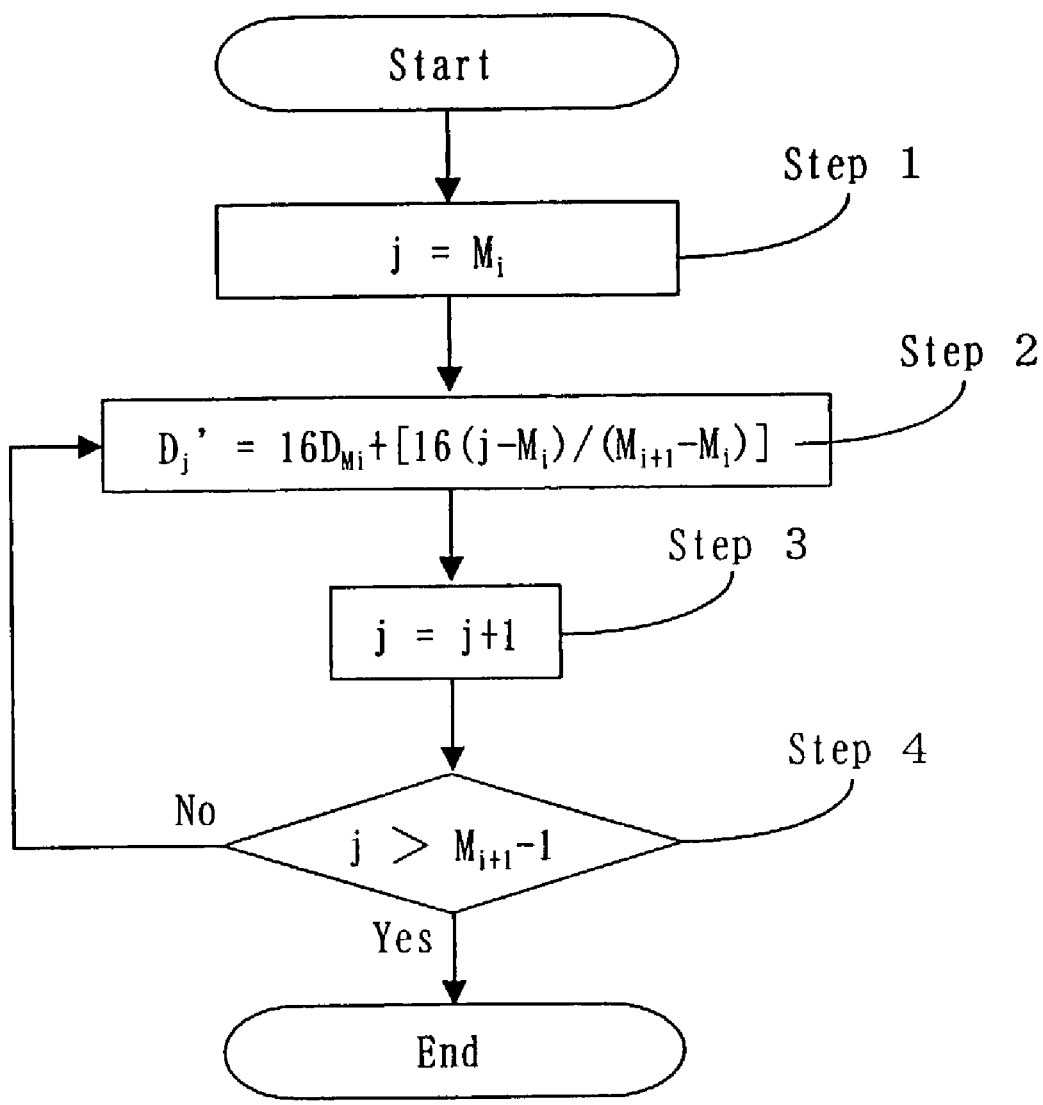
FIG. 19 is a flowchart illustrating the fundamental algorithm of processing performed by the signal expansion section of the image processing apparatus in the second example.

Next, signal expansion performed by the signal expansion section 154 will be described with reference to FIGS. 13 and 19. FIG. 19 is a flowchart illustrating the algorithm of signal expansion performed by the signal expansion section 154.

Figure 18:
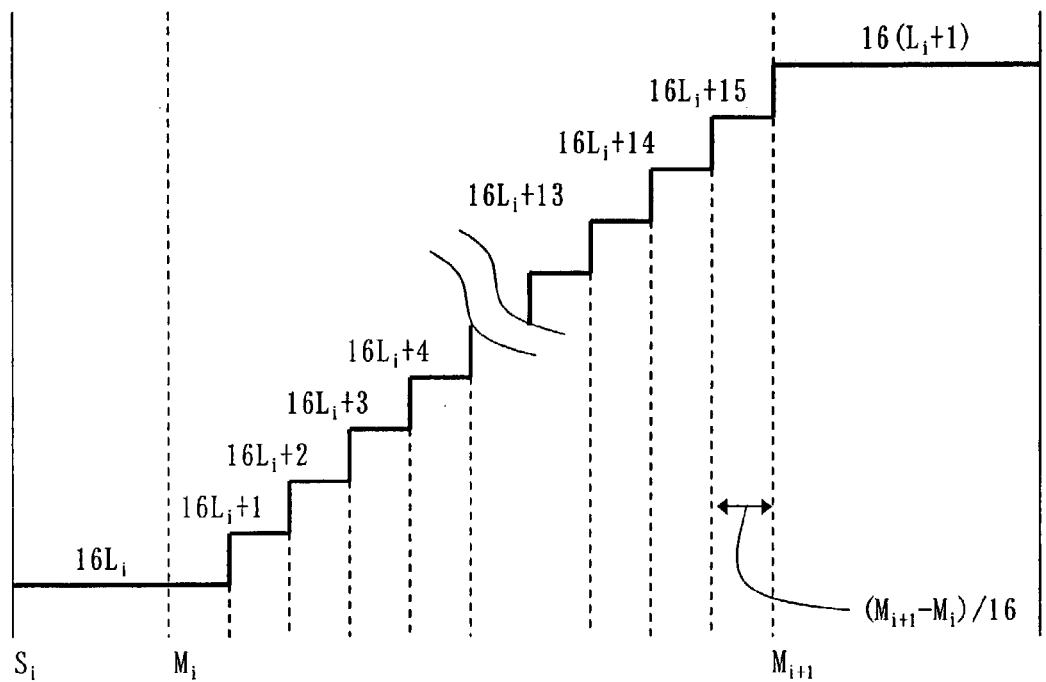
FIG. 18 schematically shows an exemplary image signal obtained by the signal expansion performed by the signal expansion section of the image processing apparatus in the second example.

The signal expansion performed by the signal expansion section 154 expands a pixel value represented by 6 bits into a pixel value represented by 10 bits. Specifically, the signal expansion section 154 is performed as follows. Pixel values $L_i$ and $L_i+1$ ($L_i=0$ through 63) of 6-bit data are respectively $16L_i$ and $16(L_i+1)$ ($16L_i=0$ through 1023) in the 10-bit representation. The signal expansion is performed such that the pixels at $M_i$ through ($S_{i+1}-1$) having the pixel value $16L_i$, and the pixels at ($S_{i+1}$) through ($M_{i+1}-1$) having the pixel value $16(L_i+1)$, obtains the pixel values $16L_i+j$ (which are pixel values of 10-bit data; j is an integer of 0 through 15). The pixel values should be changed by $[(M_{i+1}-M_i)/16]$ pixels. In order to provide the above-mentioned pixels with the above-mentioned pixel values, 4 lowest bits are added to the 6-bit signals so as to expand the 6-bit signals into 10-bit signals. Owing to such signal expansion, the stepwise change from $L_i$ to $L_i+1$ due to the insufficient number of bits is changed to the smooth and linear gradation change as shown in FIG. 18.

Now, with reference to FIGS. 13 and 19, the processing of the signal expansion section 154 will be described. In the following description, $D_j$ represents the 6-bit pixel value at pixel position value j, and $D_j'$ represents the 10-bit pixel value at pixel position value j after signal expansion.

Referring to FIG. 19, in step 1, $j=M_i$ is set.

In step 2, signal expansion is performed for 6-bit image data $D_j$ at pixel position value j, so as to obtain 10-bit expanded image data $D_j'$.

The processing of step 2 performed by the signal expansion section 154 will be described also with reference to FIG. 13.

The first 16-times operation section 169 receives and multiplies image data $D_{Mi}$ at pixel position value $M_i$ by 16. The first subtraction section 170 receives pixel position values j and $M_i$ and performs a subtraction to obtain ($j-M_i$). The second subtraction section 171 receives pixel position values $M_{i+1}$ and $M_i$ and performs a subtraction to obtain ($M_{i+1}-M_i$).

The value ($j-M_i$) obtained by the first subtraction section 170 is input to the second 16-times operation section 172. The second 16-times operation section 172 multiplies the value ($j-M_i$) by 16 to obtain $16(j-M_i)$.

The division section 173 receives $16(j-M_i)$ obtained by the second 16-times operation section 172 and the value ($M_{i+1}-M_i$) obtained by the second subtraction section 171. These values are processed with the division to obtain $[16(j-M_i)/(M_{i+1}-M_i)]$.

The addition section 174 receives $16D_{Mi}$ obtained by the first 16-times section 169 and the value $[16(j-M_1)/(M_{i+1}-M_i)]$ obtained by the division section 173, and adds them together to obtain a 10-bit expanded image signal $D_j'=16D_{Mi}+[16(j-M_i)/(M_{i+1}-M_i)]$. $D_{Mi}$ is the 6-bit pixel value at $M_i$. When no data exchange has been performed ($L_{i+1}-L_i=1$), $D_{Mi}=L_i$. When data exchange has been performed ($L_i-L_{i+1}=1$), $D_{Mi}=L_{i+1}$.

When the signal expansion by the signal expansion section 154 is finished, the processing advances to step 3, where j is updated to j+1.

In step 4, it is determined whether or not the updated j, that is, (j+1) exceeds ($M_{i+1}-1$). When (j+1) does not exceed ($M_{i+1}-1$), the processing returns to step 2, where the processing of step 2 is performed for (j+1). When (j+1) exceeds ($M_{i+1}-1$), the signal expansion is terminated.

The image processing apparatus 43A according to the second example operates as follows. The detection section 153 detects an image pattern in which two or more pixels having the same pixel value L are continuous and the two or more pixels are followed by two or more pixels having the same pixel value (L+1) or (L−1). The detection section 153 also stores the value $S_i$ representing the position of the first pixel among the continuous pixels having the same pixel values, and the width (number of pixels) $W_i$ of the continuous pixels having the same pixel values. Using $S_i$ and $W_i$, the signal expansion section 154 expands the 6-bit image data to 10-bit image data. Therefore, the display capability of the liquid crystal panel 45 (FIG. 1) can be fully utilized. The problem of the conventional apparatus that the stepwise or discontinuous change of color tones occurs due to the insufficient number of bits is solved, and smooth and linear graduation change is provided.

The image processing apparatus 43A in the second example is connected between the liquid crystal controller and the liquid crystal driver as in the first example. The image processing apparatus 43A may be provided at another location, for example, in the liquid crystal controller.

When the image processing apparatus 43A is located in the liquid crystal controller, the image processing apparatus 43A and the signal processing section may be formed of different circuits. Alternatively, the image processing apparatus 43A and the signal processing section may be integrated into a one-chip microcomputer for realizing multi-purpose processing.

In such a case, the image processing programs described above with reference to FIGS. 14, 15 and 19 may be stored in the external memory 22 (FIG. 1) of the external host system 2, so that liquid crystal controller 41 (FIG. 1) can be controlled by the external host system 2 to execute the programs. Alternatively, the programs may be stored in a built-in memory in the liquid crystal controller 41 and/or the liquid crystal driver 44.

The liquid crystal display apparatus described in the second example realizes a color image by combination of R, G and B pixels. The present invention is not limited to this, and an image processing apparatus is applicable to single-color liquid crystal display apparatuses. An image processing apparatus is applicable to, for example, ELDs (electroluminescence displays) or PDPs (plasma display panels).

In the second example, signal expansion is performed based on pixels adjacent in the horizontal direction (i.e., the direction in which image signals are sequentially transferred on an image display screen). In the case where a section for storing vertical lines such as a frame memory is provided, signal expansion can be performed based on pixels adjacent in the vertical direction (i.e., the direction vertical to the direction in which image signals are sequentially transferred on an image display screen). In the case where a section for storing image data which has been detected and expanded for each line is provided, signal expansion based on pixels adjacent in the horizontal direction, signal expansion based on pixels adjacent in the vertical direction, and signal expansion based on pixels adjacent an oblique line may be combined. The signal expansion may also be performed in a curved manner (for example, projecting upward or downward), instead of linearly. By performing signal processing based on pixels adjacent in multiple directions, more natural images having a higher degree of freedom can be provided.

According to the first and second examples of the present invention, high quality image display is provided with a simple circuit configuration. Signal expansion is performed for each color components of a color image, by comparing a plurality of image data having a prescribed pixel width and then adding lower bit values which were cut off in the pre-expansion image data. Namely, higher bit values are predicted and reproduced. As a result, color resolution is improved, and thus smooth and linear gradation change is realized.

In the first and second examples, the prescribed pixel width can be automatically optimized, and adjusted for each image or each portion of the same image.

EXAMPLE 3

In a third example of the present invention, an image processing apparatus for expanding a 6-bit digital image signal into an 8-bit digital image signal to be supplied to a liquid crystal panel will be described. In the third example, the detection and signal expansion described in the first example is performed block by block. The liquid crystal panel used in the third example has a display area of 640 pixel (horizontal)×480 pixels (vertical).

It should be noted that the image processing apparatus according to the present invention is not limited to an apparatus for processing images to be supplied to a liquid crystal panel. The liquid crystal panel used with the image processing apparatus of the present invention is not limited to have a display area of 640 pixels×480 pixels. These are merely exemplary.

The liquid crystal display apparatus used in the third example has substantially the same structure as that of the liquid crystal display apparatus 1 (FIG. 1) used in the first example, and thus will not be described in detail.

Figure 20:
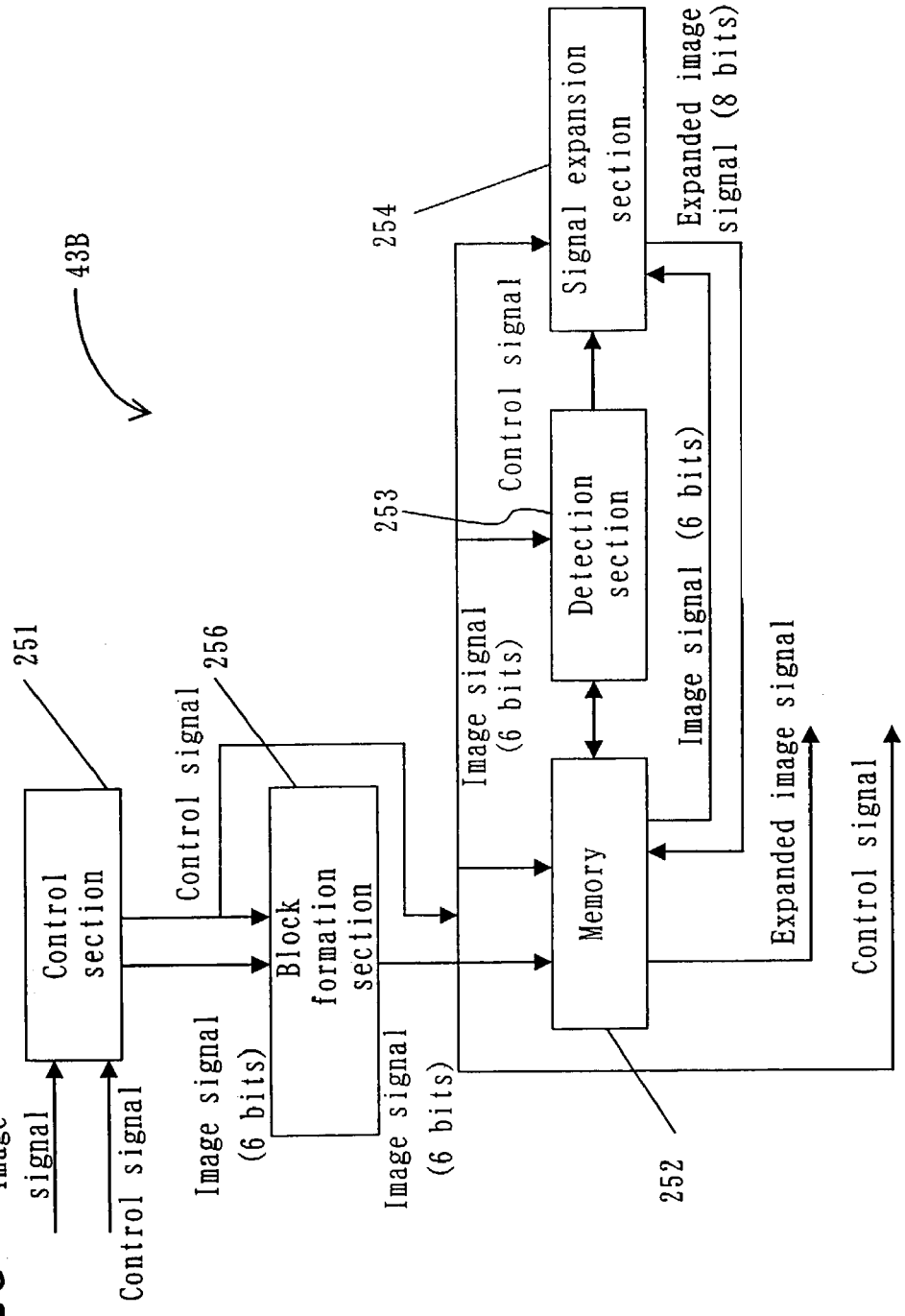
FIG. 20 is a block diagram of an image processing apparatus according to a third example of the present invention.

FIG. 20 is a block diagram illustrating a partial structure of the image processing apparatus 43B according to the third example.

The image processing apparatus 43B includes a control section 251, a memory 252, a detection section 253, a signal expansion section 254, and a block formation section 256.

The control section 251 receives a 6-bit signal and a control signal which are output from the liquid crystal controller 41 (FIG. 1). The control signal is output to each of the memory 252, the detection section 253, the signal expansion section 254, the block formation section 256 and the liquid crystal driver 44 (FIG. 1). The 6-bit image signal is output from the control section 251 to the block formation section 256. The control section 251 controls the memory 252, the detection section 253, the signal expansion section 254 and the block formation section 256, such that image data processed by these sections are synchronized with the control signal when being output to the liquid crystal driver 44 (FIG. 1).

The block formation section 256 divides a 6-bit signal which is input from the control section 251 into a plurality of blocks. Each block corresponds to, for example, 64 pixels. The block formation section 256 outputs the 6-bit signal to the memory 252, while synchronizing the 6-bit image signal to the control signal which is output from the control section 251, on a block-by-block basis.

The memory 252 sequentially reads the 6-bit image signal from the block formation section 256 while synchronizing the 6-bit image signal to the control signal, block by block. The memory 252 also reads the 8-bit expanded image signal which is generated by the signal expansion section 254 and outputs the 8-bit expanded image signal to the liquid crystal driver 44 (FIG. 1).

The detection section 253 reads the 6-bit image signal which is output from the memory 252, and detects a portion of the image signal which is represented by stepwise or discontinuous gradation change, i.e., a pseudo profile. The pseudo profile is caused by insufficient number of bits of image signals, and deteriorates the image quality. Generally in an image, the pseudo profile is stepwise stripes of gradations.

More specifically, the detection section 253 performs the following operation regarding a 6-bit image signal. The detection section 253 detects an image pattern in which two or more pixels having the same pixel value L (L is an arbitrary integer of 0 through 63) are continuous and the two or more pixels are followed by two or more pixels having the same pixel value (L+1) or (L−1). The detection section 253 also stores the value representing the position of the first pixel among the continuous pixels having the same pixel values, and the width (number of pixels) of the continuous pixels having the same pixel values. The detection section 253 outputs the value representing the position and the width to the signal expansion section 254.

The signal expansion section 254 adds 2 lowest bits to the 6-bit image signal corresponding to the pixels which are detected by the detection section 253 and are a target of the signal expansion, thereby generating an 8-bit image signal. The addition of 2 bits is performed as described later, such that the discontinuous portion of the image caused by the insufficient number of bits is eliminated and the smooth gradation change is realized. To the image signal corresponding to pixels which are not a target of the signal expansion, 2 lowest bits "00" are added, thereby generating an 8-bit image signal. Thus, all the 6-bit image signals are expanded to 8-bit image signals. The 8-bit image signals expanded by the signal expansion section 254 are written to the memory 252.

The detection section 253 and the signal expansion section 254 perform the above-described processing for each of R, G and B pixels. After one block of pixels are processed, the next block of pixels are processed in the same manner. (640/64)×480=4800 blocks of pixels are processed in total, and thus one image is displayed.

Where the number of pixels included in one block of the image signal is increased, the required memory capacity is increased and thus the production cost is increased. However, the effect of improving the image quality is improved. By contrast, when the number of pixels included in one block of the image signal is decreased, the required memory capacity is decreased and thus the production cost is decreased. However, the effect of improving the image quality is reduced. In the third example, each block includes 64 pixels. The number of pixels included in each block may be freely set in accordance with, for example, the intended production cost, memory capacity or effect of improving the image quality.

In the third example, when the difference between the pixel values of two adjacent pixel is 1 and it is detected that two or more pixels having the same pixel values are continuous, signal expansion is performed. The present invention is not limited to this, and threshold values such as the difference between the pixel values of two adjacent pixel and the number of continuous pixels for signal expansion can be freely set.

Figure 21:
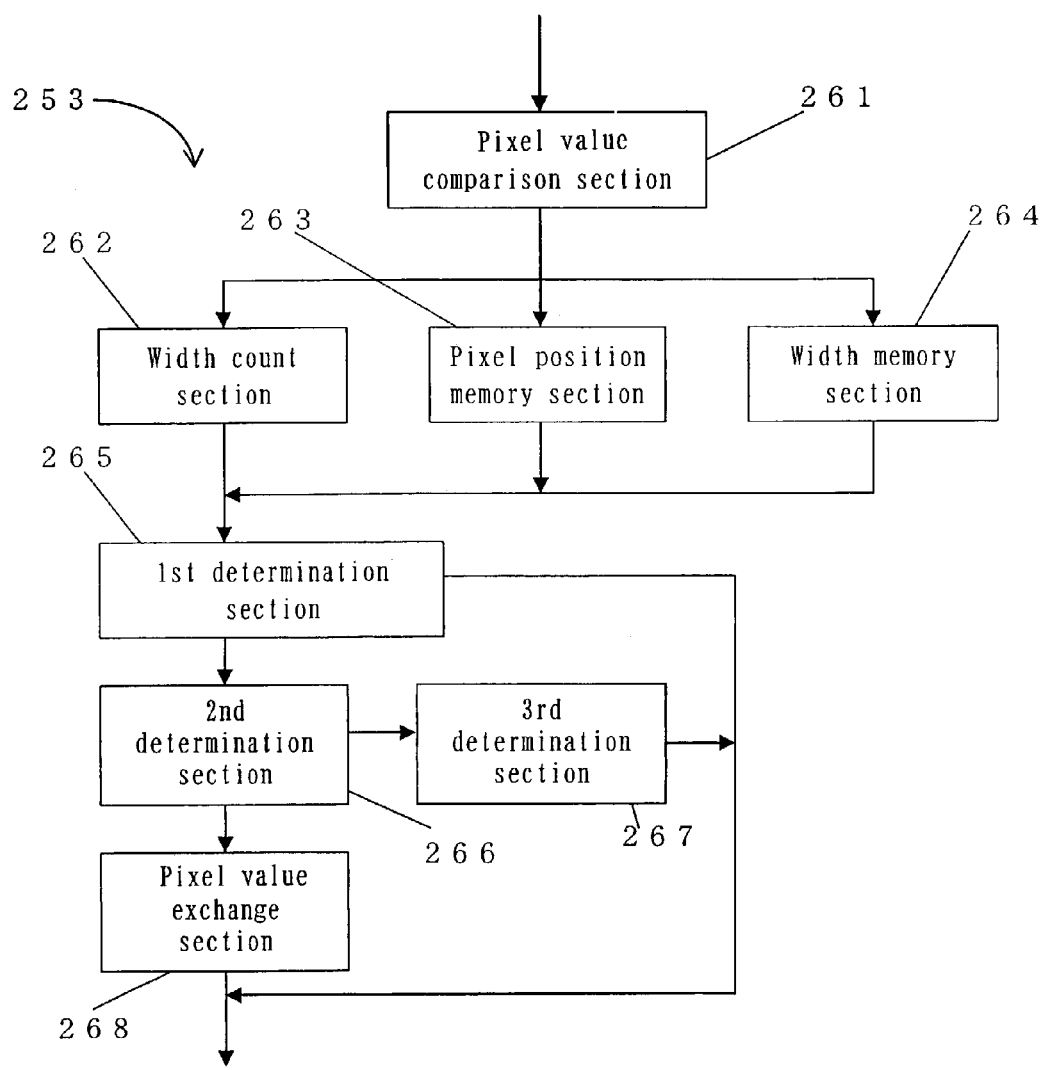
FIG. 21 is a block diagram of a detection section of the image processing apparatus in the third example.

Next, the structure of the detection section 253 will be described in more detail with reference to FIG. 21.

The detection section 253 includes a pixel value comparison section 261, a width count section 262, a pixel position memory section 263, a width memory section 264, first through third determination sections 265 through 267, and a pixel value exchange section 268.

The pixel value comparison section 261 is connected to the memory 252 (FIG. 20) and compares whether the pixel values of adjacent pixels which are read from the memory 252 are equal to each other or not.

The width count section 262 is connected to the pixel value comparison section 261. When the comparison result of the pixel value comparison section 261 shows that the pixel values of the adjacent pixels are equal to each other (i.e., the pixels having the same pixel value are continuous), the width count section 262 adds "1" to the width of the image data.

The pixel position memory section 263 is connected to the pixel value comparison section 261. When the comparison result of the pixel value comparison section 261 shows that the pixel values of the adjacent pixels are equal to each other (i.e., the pixels having the same pixel value are continuous), the pixel position memory section 263 stores the value representing the position of the first pixel among the continuous pixels.

The width memory section 264 is connected to the pixel value comparison section 261. When the comparison result of the pixel value comparison section 261 shows that a first series of pixels having the same pixel value is terminated, the width memory section 264 stores the width of the pixels having the same pixel value (number of pixels).

The first determination section 265 is connected to the width count section 262, the pixel position memory section 263, and the width memory section 264. The first determination section 265 determines whether or not the difference between (i) the value representing the position of the first pixel of the first series of pixels having the same pixel value (stored by the pixel position memory section 263) and (ii) the value representing the position of the first pixel of the next (second) series of pixels having the same pixel value is equal to the width stored by the width memory section 264.

The second determination section 266 is connected to the first determination section 265. The second determination section 266 determines whether or not the pixel value of the first series of pixels having the same pixel values is larger by, for example, 1 than the pixel value of the second series of pixels having the same pixel values.

The third determination section 267 is connected to the second determination section 266. The third determination section 267 determines whether or not the pixel value of the first series of pixels having the same pixel values is smaller by, for example, 1 than the pixel value of the second series of pixels having the same pixel values.

When the determination result of the first determination section 265 is "equal" and the determination result of the second determination section 266 is "larger by 1", the signal exchange section 268 connected to the second determination section 266 symmetrically exchanges the image data in the memory 252 to be processed by signal expansion.

The processing performed by the pixel value comparison section 261, the width count section 262, the pixel position memory section 263, and the width memory section 264 will be described below with reference to FIG. 23. The processing performed by the first determination section 265, the second determination section 266, and the third determination section 267, and the pixel value exchange section 268 will be described below with reference to FIG. 24.

Figure 22:
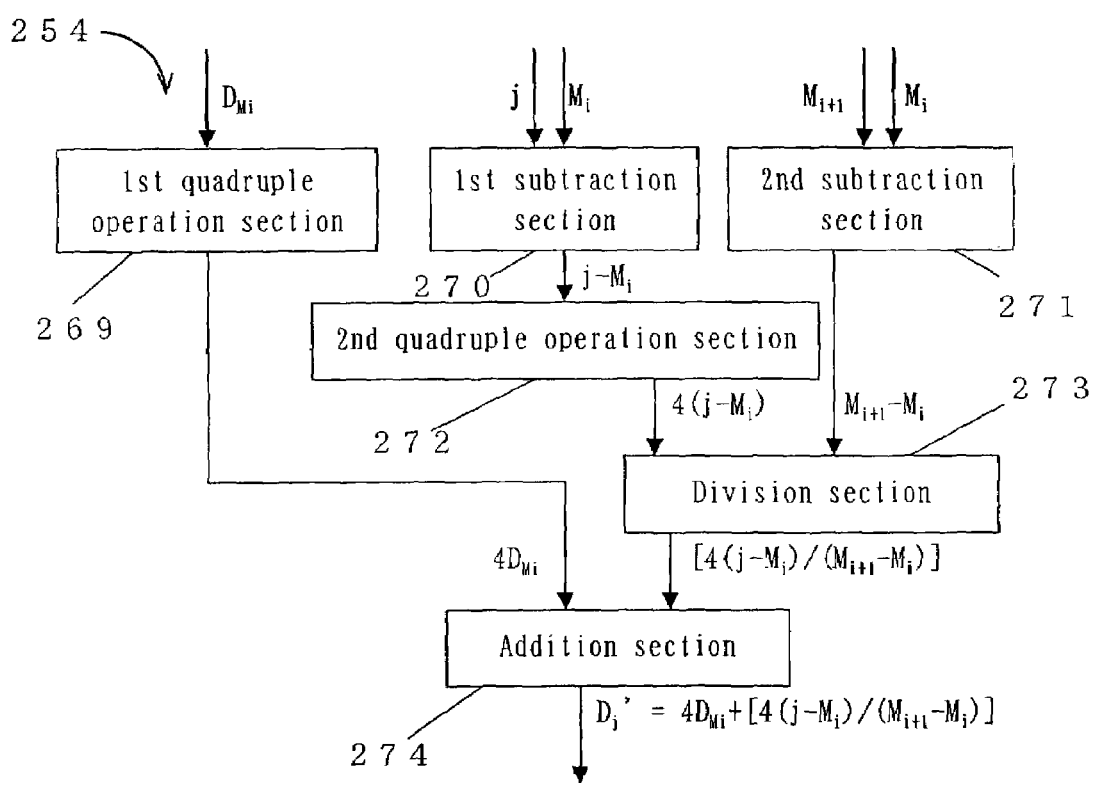
FIG. 22 is a block diagram of a signal expansion section of the image processing apparatus in the third example.

The structure of the signal expansion section 254 will be described in more detail with reference to FIG. 22.

The signal expansion section 254 includes a first quadruple operation section 269, a first subtraction section 270, a second subtraction section 271, a second quadruple operation section 272, a division section 273, and an addition section 274.

The first quadruple operation section 269 includes a 2-bit shift circuit, and quadruples the value of an input signal using the 2-bit shift circuit ($4D_{Mi}$).

The first subtraction section 270 and the second subtraction section 271 each include a subtraction circuit, and perform a subtraction of the value of an input signal using the subtraction circuit ($j-M_i$ and $M_{i+1}-M_i$).

The second quadruple operation section 272 includes a 2-bit shift circuit, and quadruples the value of an input signal using the 2-bit shift circuit $4(j-M_i)$).

The division section 273 includes a division circuit, and performs a division of the value of an input signal using the division circuit ($[4(j-M_i)/(M_{i+1}-M_i)]$).

The addition section 274 includes an addition circuit, and performs an addition of the value of an input signal using the addition circuit ($[4D_{Mi}+[4(j-M_i)/(M_{i+1}-M_i)]$)

Figure 23:
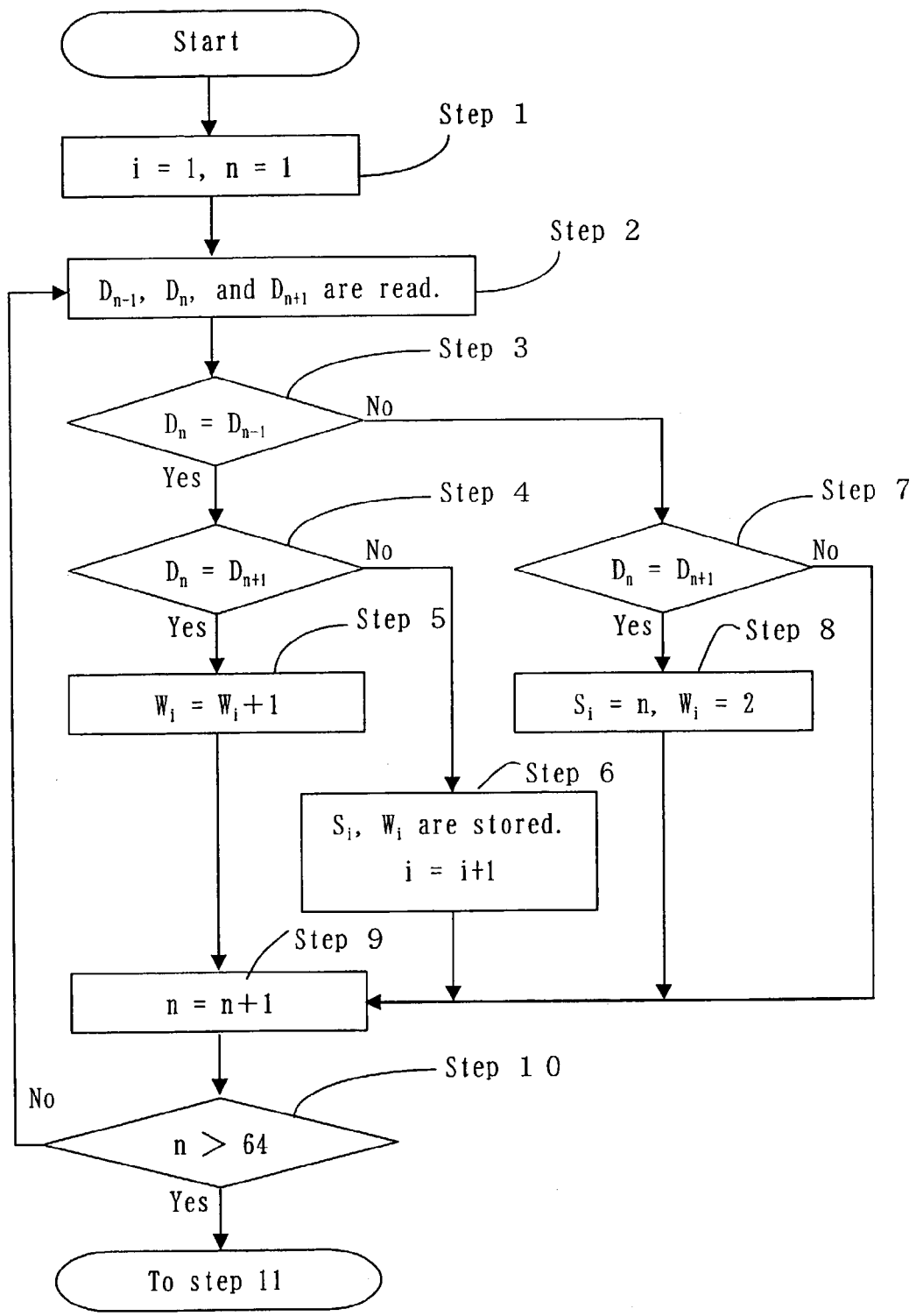
FIG. 23 is a flowchart illustrating a first half of the fundamental algorithm of processing performed by the detection section and the signal expansion section of the image processing apparatus in the third example.
Figure 24:
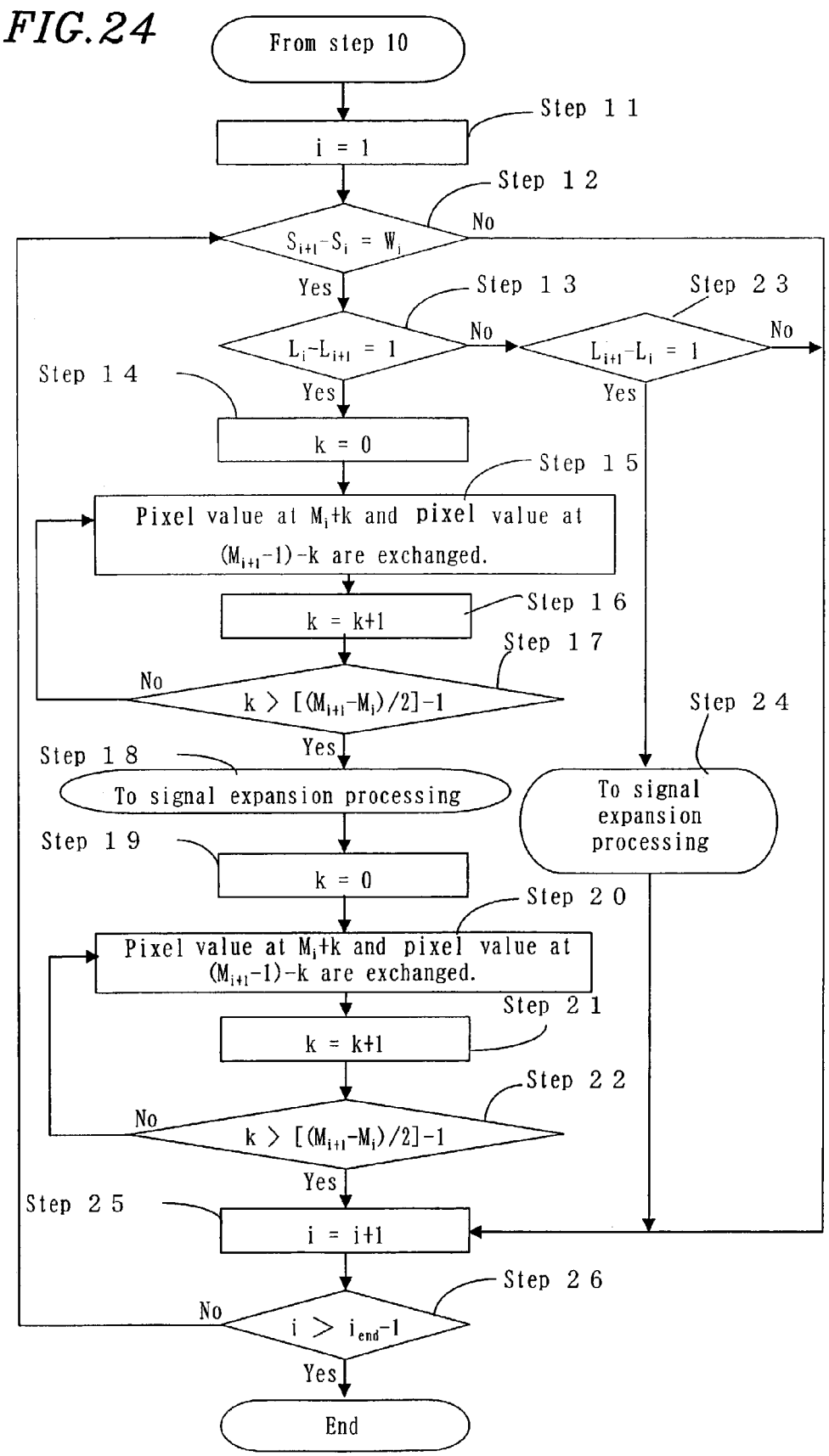
FIG. 24 is a flowchart illustrating a second half of the fundamental algorithm of processing performed by the detection section and the signal expansion section of the image processing apparatus in the third example.

With reference to FIGS. 23 and 24, the fundamental algorithm of processing performed by the detection section 253 (FIG. 21) and the signal expansion section 254 (FIG. 22) will be described. FIG. 23 illustrates the first half of the processing of the detection section 253 and the signal expansion section 254. FIG. 24 illustrates the second half of the processing of the detection section 253 and the signal expansion section 254. In FIGS. 23 and 24, "n" represents the number assigned to each pixel of each block in the order of the positions of the pixels. In the third example, each block includes 64 pixels, and "n" is a natural number in the range of 1 through 64. The pixel values of pixels of each block are represented by $D_1, D_2, \ldots D_{64}$ in correspondence with the values of "n". "i" is assigned to each pixel in a series of two or more pixels having the same pixel value ($1 \leq i < n$). The values of "i" are assigned sequentially from one end of the series of pixels. $S_i$ is the value representing the position of the first pixel among the series of pixels, and $W_i$ represents the number of pixels in the series of pixels. For example, when the pixel values $D_1=D_2=D_3$ and $D_4=D_5$, $S_1=1$, $W_1=3$, $S_2=4$, and $W_2=2$.

The processing of the detection section 253 and the signal expansion section 254 is performed as follows.

Referring to FIG. 23, in step 1, i=1 and n=1 are set.

In step 2, image data $D_{n-1}$, $D_n$, and $D_{n+1}$ are read by the pixel value comparison section 261.

In step 3, the pixel values of image data (pixel) $D_n$ and image data $D_{n-1}$ (which is immediately preceding $D_n$) are compared to each other by the pixel value comparison section 261.

When the comparison result of the pixel value comparison section 261 in step 3 shows that image data $D_n$ and image data $D_{n-1}$ have the same pixel value, the processing advances to step 4, where the pixel values of image data $D_n$ and image data $D_{n+1}$ (which is immediately succeeding $D_n$) are compared to each other by the pixel value comparison section 261.

When the comparison result of the pixel value comparison section 261 in step 3 shows that image data $D_n$ and image data $D_{n-1}$ do not have the same pixel value, the processing advances to step 7, where the pixel values of image data $D_n$ and image data $D_{n+1}$ are compared to each other by the pixel value comparison section 261.

When the comparison result of the pixel value comparison section 261 in step 4 shows that image data $D_n$ and image data $D_{n+1}$ have the same pixel value, image data $D_{n-1}$, $D_n$ and $D_{n+1}$ all have the same pixel value. The processing advances to step 5, where the width count section 262 adds +1 to the width $W_i$ stored in the width memory section 264, and the processing advances to step 9.

When the comparison result of the pixel value comparison section 261 in step 4 shows that image data $D_n$ and image data $D_{n+1}$ do not have the same pixel value, image data $D_{n-1}$ and $D_n$ have the same pixel value but image data $D_n$ and $D_{n+1}$ do not have the same pixel value. This indicates that the series of pixels having the same pixel value is terminated at data Dn. Therefore, $S_i$ and $W_i$ are stored in the pixel position memory section 263 and the width memory section 264 respectively, and i is updated to i+1.

When the comparison result of the pixel value comparison section 261 in step 3 shows that image data $D_n$ and image data $D_{n-1}$ do not have the same pixel value, and the comparison result of the pixel value comparison section 261 in step 7 shows that image data $D_n$ and image data $D_{n+1}$ have the same pixel value, the pixel corresponding to image data $D_n$ is the first pixel of the series of pixels having the same pixel value. Therefore, $S_i$=n is stored in the pixel position memory section 263 and $W_i$=2 is stored in the width memory section 264. The processing advances to step 9.

When the comparison result of the pixel value comparison section 261 in step 7 shows that image data $D_n$ and image data $D_{n+1}$ do not have the same pixel value, image data $D_{n-1}$, $D_n$ and $D_{n+1}$ all have different pixel values, namely, there is no series of pixels having the same pixel value in this portion. Therefore, the processing advances to step 9 without storing any data in the pixel position memory section 263 or the width memory section 264.

In step 9, n is updated to (n+1). In step 10, it is determined whether or not the updated n, that is, (n+1) exceeds 64. When (n+1) does not exceed 64, the processing returns to step 2, and the processing of steps 2 through 10 is performed for (n+1). When (n+1) exceeds 64, the processing advances to step 11 (FIG. 24).

In this manner, the above-described processing is performed for all the values of n (1 through 64).

In the processing shown in FIG. 24, the value $S_i$ (the value representing the position of the first pixel of the series of pixels) and $W_i$ (the number of pixels of the series of pixels), which are stored in the processing shown in FIG. 23, are used to determine whether the signal should be expanded or not and expands the signal when necessary. In the following description, $L_i$ represents the pixel value of the first pixel (at $S_i$) of the series of pixels.

The pixel position value at the center between $S_i$ and $S_i+W_i$ is $M_i$, and the pixel position value at the center between $S_{i+1}$ and $S_{i+1}+W_{i+1}$ is $M_{i+1}$. More accurately, $M_i$ and $M_{i+1}$ are respectively the pixel position values represented by $M_i=S_i+[W_i/2]$ and $M_{i+1}=S_{i+1}+[W_{i+1}/2]$. "[ ]" is the Gauss symbol, and [a] represents the maximum integer not exceeding the value a.

First, in step 11, i=1 is set.

In step 12, it is determined by the first determination section 265 whether or not $S_{i+1}-S_i=W_i$. When it is determined that $S_{i+1}-S_i=W_i$, the processing advances to step 13. When it is not determined that $S_{i+1}-S_i=W_i$, the processing advances to step 25.

In step 13, it is determined by the second determination section 266 whether or not $L_i-L_{i+1}$. When it is determined that $L_i-L_{i+1}$, the processing advances to step 14. When it is not determined that $L_i-L_{i+}=1$, the processing advances to step 23.

In step 23, it is determined by the third determination section 267 whether or not $L_{i+1}-L_i=1$. When it is determined that $L_{i+1}-L_i=1$, the processing advances to step 24, where the signal expansion section 254 performs signal expansion. When it is not determined that $L_{i+1}-L_i=1$, the processing advances to step 25.

In step 14, k=0 is set. k is an integer which is represented by 0 through $[(M_{i+1}-M_i)/2]-1$.

Next, in step 15, the pixel value of pixel position value ($M_i$+k) and the pixel value of pixel position value ($M_{i+1}-1)-k$) are exchanged with each other by the signal exchange section 268. When the processing of step 15 is finished, the processing advances to step 16, where k is updated to (k+1).

Then, the processing advances to step 17. It is determined whether or not the updated k, that is, (k+1) exceeds $[(M_{i+1}-M_i)/2]-1$. When (k+1) does not exceed $[(M_{i+1}-M_i)/2]-1$, the processing returns to step 15, and the processing of step 15 is performed for (k+1). When (k+1) exceeds $[(M_{i+1}-M_i)/2]-1$ in step 17, the processing advances to step 18.

Thus, the above-described processing is performed for all the values of k (0 through $[(M_{i+1}-M_i)/2]-1$).

When the processing of step 17 is finished, the processing advances to step 18, where the signal expansion section 254 performs signal expansion.

When the processing of step 18 is finished, the processing advances to step 19, where k=0 is set. k is an integer represented by 0 through $[(M_{i+1}-M_i)/2]-1$.

Next, in step 20, the pixel value of pixel position value ($M_i$+k) and the pixel value of pixel position value (($M_{i+1}-1)-k$) are exchanged with each other. When the processing of step 20 is finished, the processing advances to step 21, where k is updated to (k+1).

Then, the processing advances to step 22. It is determined whether or not the updated k, that is, (k+1) exceeds $[(M_{i+1}-M_i)/2]-1$. When (k+1) does not exceed $[(M_{i+1}-M_i)/2]-1$, the processing returns to step 20, and the processing of step 20 is performed for (k+1). When (k+1) exceeds $[(M_{i+1}-M_i)/2]-1$ in step 22, the processing advances to step 25.

Thus, the above-described processing is performed for all the values of k (0 through $[(M_{i+1}-M_i)/2]-1$).

In step 25, i is updated to (i+1).

In step 26, it is determined whether or not the updated i, that is, (i+1) exceeds $i_{end}-1$. $i_{end}$ represents the maximum value of i which is set in the processing of FIG. 23. When (i+1) does not exceed $i_{end}-1$, the processing returns to step 12, wherein the processing of steps 12 through 26 is performed for (i+1). When (i+1) exceeds $i_{end}-1$, the processing of the detection section 253 and the signal expansion section 254 is terminated.

In this manner, the above-described processing is performed for all the values of i (1 through $i_{end}-1$).

The processing shown in FIG. 24 performed by the detection section 253 and the signal expansion section 254 will be described in more detail.

The value $S_i$ representing the position of the first pixel of the series of pixels, and $W_i$ (width or the number of pixels of the series of pixels) (i=1, 2, . . . , $i_{end}$), are stored by the processing shown in FIG. 23. In the processing shown in FIG. 24, signal expansion is performed only when $S_{i+1}-S_i=W_i$ and $L_iL_{i+1}=1$ or when $S_{i+1}-S_i=W_i$ and $L_{i+1}-L_i=1$ (low frequency portion). Signal expansion is not performed when the difference between $L_i$ and $L_{i+1}$ is ±2 or more (high frequency portion). Actual signal expansion is performed for the pixels at $M_i$ through $(M_{i+1}-1)$, as described below.

When $S_{i+1}-S_i=W_i$ and $L_{i+1}-L_i=1$, signal expansion is performed by the signal expansion section 254. When $S_{i+1}-S_i=W_i$ and $L_iL_{i+1}=1$, the data of the pixels at $M_i$ through $(M_{i+1}-1)$ is symmetrically exchanged as follows. The image data at $M_i$ and the image data at $(M_{i+1}-1)$ are exchanged. The image data at $(M_i+1)$ and the image data at $(M_{i+1}-2)$ are exchanged. The image data at $(M_i+2)$ and the image data at $(M_{i+1}-3)$ are exchanged. Such data exchange is continued until the image data $(M_i+[(M_{i+1}-M_i)/2]-1)$ and the image data at $(M_{i+1}-[(M_{i+1}-M_i)/2])$ are exchanged. After that, signal expansion is performed. After the signal expansion is finished, data exchange is again performed so as to return the image data. The data exchange is performed so that similar signal expansion can be performed regardless of whether the pixel value of the first series of pixels is larger or smaller than the pixel value of the second series of pixels.

Figure 25:
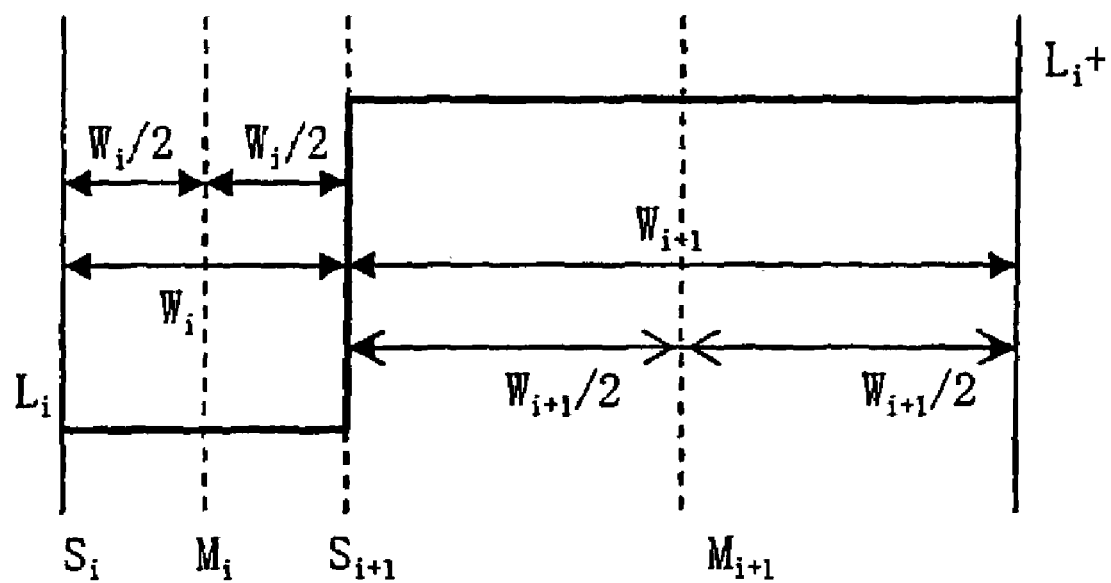
FIG. 25 schematically shows a portion of an image signal which is a target of signal expansion performed by the signal expansion section of the image processing apparatus in the third example, but is before the signal expansion.

FIG. 25 is a schematic view of an exemplary signal portion which is a target of signal expansion. The signal shown in FIG. 25 has not yet been processed by signal expansion.

Figure 26:
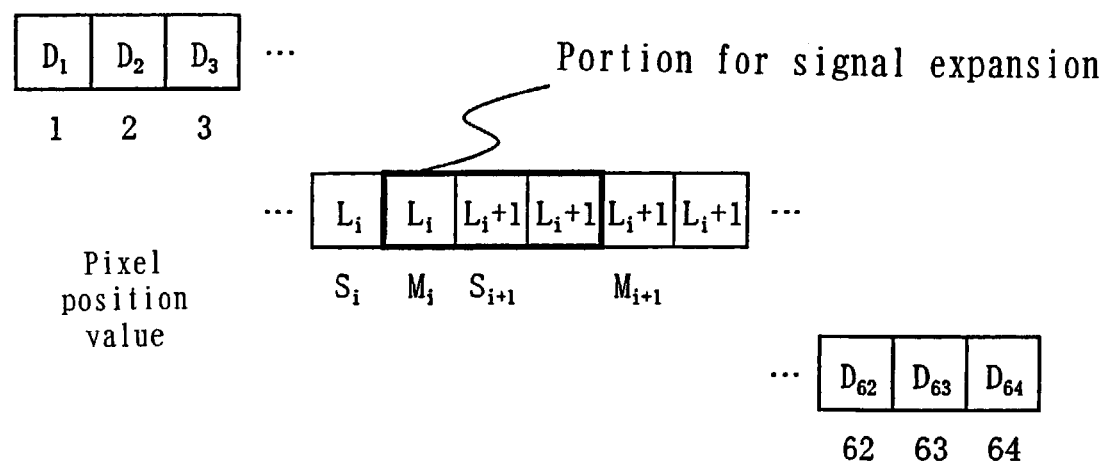
FIG. 26 schematically shows image data stored in a memory the image processing apparatus in the third example.

In the example shown in FIG. 25, pixels having pixel value $L_i$ represented by 6 bits are continued for $W_i$ from the start position value $S_i$, and then pixels having pixel value $L_{i+1}$ ($=L_i+1$) represented by 6 bits are continued for $W_{i+1}$ from the start position value $S_{i+1}$ ($=S_i+W_i$). The memory 252 stores such pixels in a line as shown in FIG. 26.

Figure 27:
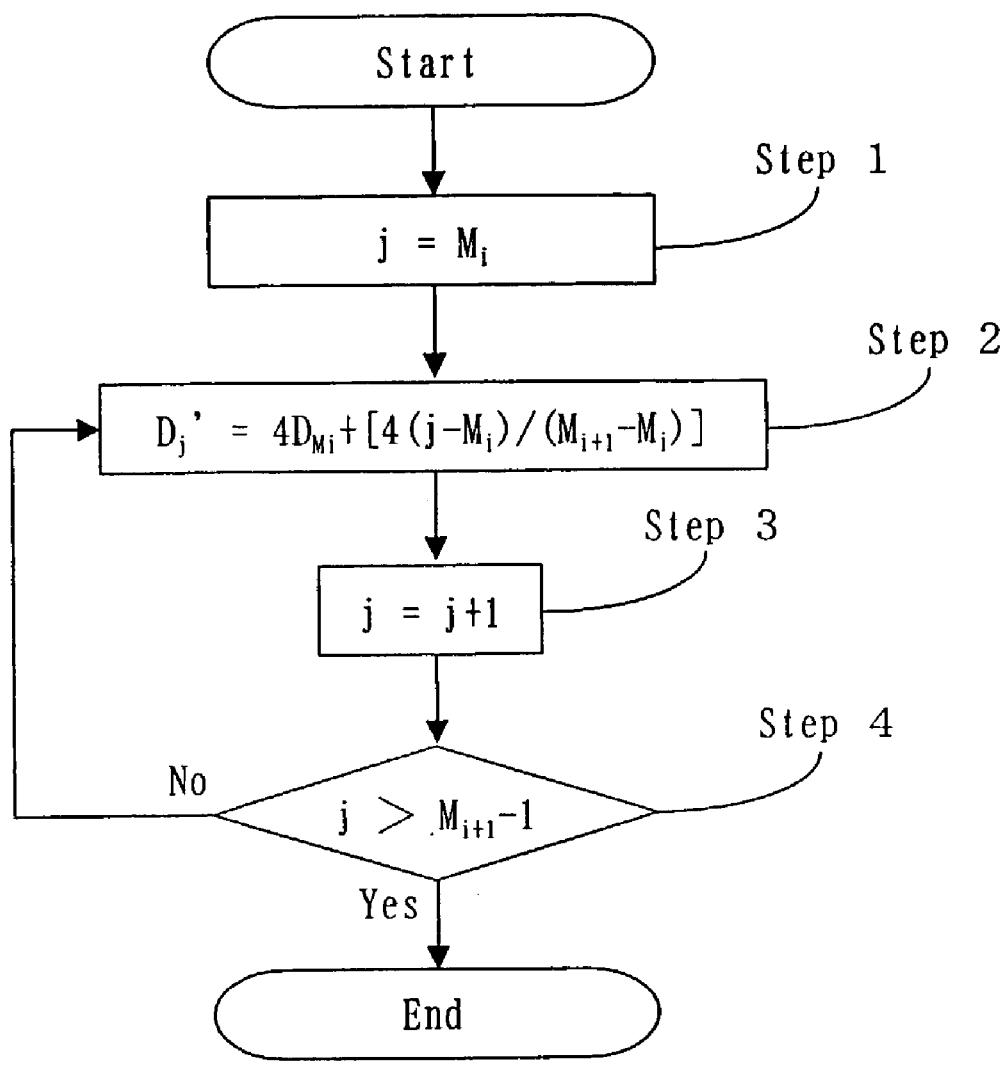
FIG. 27 is a flowchart illustrating the algorithm of processing performed by the signal expansion section of the image processing apparatus in the third example.

Next, signal expansion performed by the signal expansion section 254 will be described with reference to FIGS. 22 and 27. FIG. 27 is a flowchart illustrating the algorithm of signal expansion performed by the signal expansion section 254.

Figure 28:
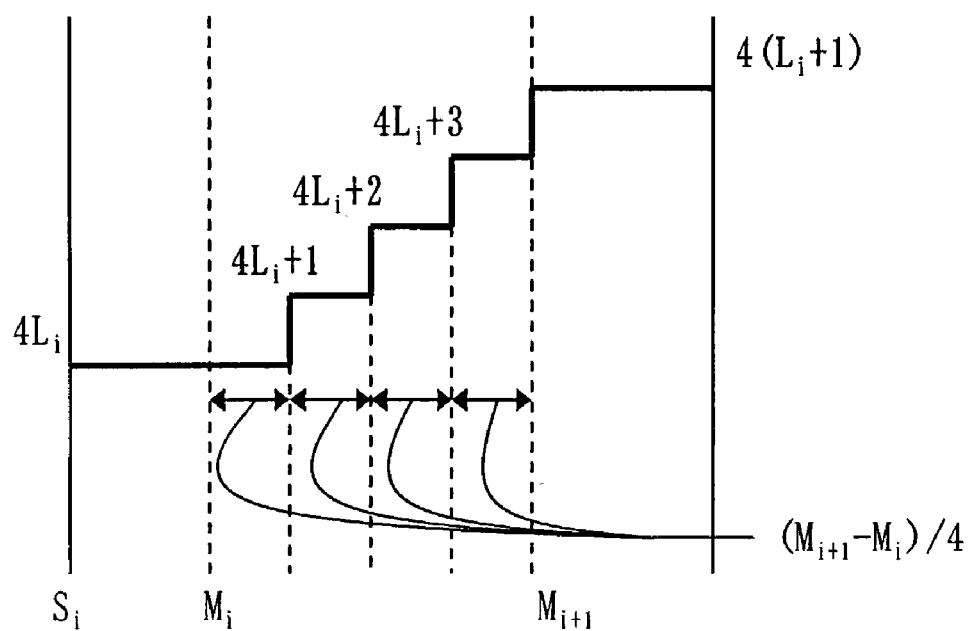
FIG. 28 schematically shows an exemplary image signal obtained by the signal expansion performed by the signal expansion section of the image processing apparatus in the third example.

The signal expansion performed by the signal expansion section 254 expands a pixel value represented by 6 bits into a pixel value represented by 8 bits. Specifically, the signal expansion section 254 is performed as follows. Pixel values $L_i$ and $L_i+1$ ($L_i=0$ through 63) of 6-bit data are respectively $4L_i$ and $4(L_i+1)$ ($4L_i=0$ through 255) in the 8-bit representation. The signal expansion is performed such that the pixels at $M_i$ through $(S_{i+1}-1)$ having the pixel value $4L_i$, and the pixels at $(S_{i+1})$ through $(M_{i+1}-1)$ having the pixel value $4(L_i+1)$, obtains the pixel values $4L_i$, $4L_i+1$, $4L_i+2$ and $4L_i+3$ (which are pixel value of 8-bit data). The pixel values should be changed from $4L_i$ to $4L_i+1$ to $4L_i+2$ and to $4L_i+3$ by $[(M_{i+1}-M_i)/4]$ pixels. In order to provide the above-mentioned pixels with the above-mentioned pixel values, 2 lowest bits are added to the 6-bit signals so as to expand the 6-bit signals into 8-bit signals. Owing to such signal expansion, the stepwise change from $L_i$ to $L_i+1$ due to the insufficient number of bits is changed to the smooth and linear gradation change as shown in FIG. 28.

Now, with reference to FIGS. 22 and 27, the processing of the signal expansion section 254 will be described. In the following description, $D_j$ represents the 6-bit pixel value at pixel position value j, and $D_j'$ represents the 8-bit pixel value at pixel position value j after signal expansion.

Referring to FIG. 27, in step 1, $j=M_i$ is set.

In step 2, signal expansion is performed for 6-bit image data $D_j$ at pixel position value j, so as to obtain 8-bit expanded image data $D_j'$.

The processing of step 2 performed by the signal expansion section 254 will be described also with reference to FIG. 22.

The first quadruple operation section 269 receives and quadruples image data $D_{Mi}$ at pixel position value $M_i$. The first subtraction section 270 receives pixel position values j and $M_i$ and performs a subtraction to obtain $(j - M_i)$. The second subtraction section 271 receives pixel position values $M_{i+1}$ and $M_i$ and performs a subtraction to obtain $(M_{i+1}-M_i)$ The value $(j-M_i)$ obtained by the first subtraction section 270 is input to the second quadruple operation section 272. The second quadruple operation section 272 quadruples the value $(j-M_i)$ to obtain $4(j-M_i)$.

The division section 273 receives $4(j - M_i)$ obtained by the second quadruple operation section 272 and the value $(M_{i+1}-M_i)$ obtained by the second subtraction section 271. These values are processed with the division to obtain $[4(j-M_i)/(M_{i+1}-M_i)]$.

The addition section 274 receives $4D_{Mi}$ obtained by the first quadruple section 269 and the value $[4(j-M_i)/(M_{i+1}-M_i)]$ obtained by the division section 273, and adds them together to obtain an 8-bit expanded image signal $D_j'=4D_{Mi}+[4(j-M_i)/(M_{i+1}-M_i)]$. $D_{Mi}$ is the 6-bit pixel value at $M_i$. When no data exchange has been performed ($L_{i+1}-L_i=1$), $D_{Mi}=L_i$. When data exchange has been performed ($L_i-L_{i+1}=1$), $D_{Mi}=L_{i+1}$.

When the signal expansion by the signal expansion section 254 is finished, the processing advances to step 3, where j is updated to j+1.

In step 4, it is determined whether or not the updated j, that is, (j+1) exceeds $(M_{i+1}-1)$. When (j+1) does not exceed $(M_{i+1}-1)$, the processing returns to step 2, where the processing of step 2 is performed for (j+1). When (j+1) exceeds $(M_{i+1}-1)$, the signal expansion is terminated.

The image processing apparatus 43B according to the third example operates as follows. The block formation section 256 divides an image signal into a plurality of blocks each including a prescribed number of pixels. The block formation section 256 then outputs the 6-bit image signal to the memory 252 on a block-by-block basis. The detection section 253 detects an image pattern in which two or more pixels having the same pixel value L are continuous and the two or more pixels are followed by two or more pixels having the same pixel value (L+1) or (L−1). The detection section 253 also stores the value $S_i$ representing the position of the first pixel among the continuous pixels having the same pixel values, and the width (number of pixels) $W_i$ of the continuous pixels having the same pixel values. Using $S_i$ and $W_i$, the signal expansion section 254 expands the 6-bit image data to 8-bit image data. Therefore, the display capability of the liquid crystal panel 45 (FIG. 1) can be fully utilized. The problem of the conventional apparatus that the stepwise or discontinuous change of color tones occurs due to the insufficient number of bits is solved, and smooth and linear graduation change is provided.

The image processing apparatus 43B in the third example is connected between the liquid crystal controller 41 and the liquid crystal driver 44. The image processing apparatus 43B may be provided at another location, for example, in the liquid crystal controller 41.

When the image processing apparatus 43B is located in the liquid crystal controller 41, the image processing apparatus 43B and the signal processing section 41b may be formed of different circuits. Alternatively, the image processing apparatus 43B and the signal processing section 41b may be integrated into a one-chip microcomputer for realizing multi-purpose processing.

In such a case, the image processing programs described above with reference to FIGS. 23, 24 and 27 may be stored in the external memory 22 (FIG. 1) of the external host system 2, so that liquid crystal controller 41 (FIG. 1) can be controlled by the external host system 2 to execute the programs. Alternatively, the programs may be stored in a built-in memory in the liquid crystal controller 41 and/or the liquid crystal driver 44.

The liquid crystal display apparatus described in the third example realizes a color image by combination of R, G and B pixels. The present invention is not limited to this, and an image processing apparatus is applicable to single-color liquid crystal display apparatuses. An image processing apparatus is applicable to, for example, ELDs (electroluminescence displays) or PDPs (plasma display panels).

In the third example, signal expansion is performed based on pixels adjacent in the horizontal direction (i.e., the direction in which image signals are sequentially transferred on an image display screen). In the case where a section for storing vertical lines such as a frame memory is provided, signal expansion can be performed based on pixels adjacent in the vertical direction (i.e., the direction vertical to the direction in which image signals are sequentially transferred on an image display screen). In the case where a section for storing image data which has been detected and expanded for each line is provided, signal expansion based on pixels adjacent in the horizontal direction, signal expansion based on pixels adjacent in the vertical direction, and signal expansion based on pixels adjacent an oblique line may be combined. The signal expansion may also be performed in a curved manner (for example, projecting upward or downward), instead of linearly. By performing signal processing based on pixels adjacent in multiple directions, more natural images having a higher degree of freedom can be provided.

The number of pixels in each block can be automatically optimized, and adjusted for each image or each portion of the same image. By randomly changing the borders between blocks row by row, the image quality can be improved with a smaller memory capacity at the same number of pixels, which can reduce the production cost.

FIG. 29 shows a display section of the liquid crystal display apparatus used in the third example. The numerals represent the order in which the image data is to be transferred.

Figure 31:
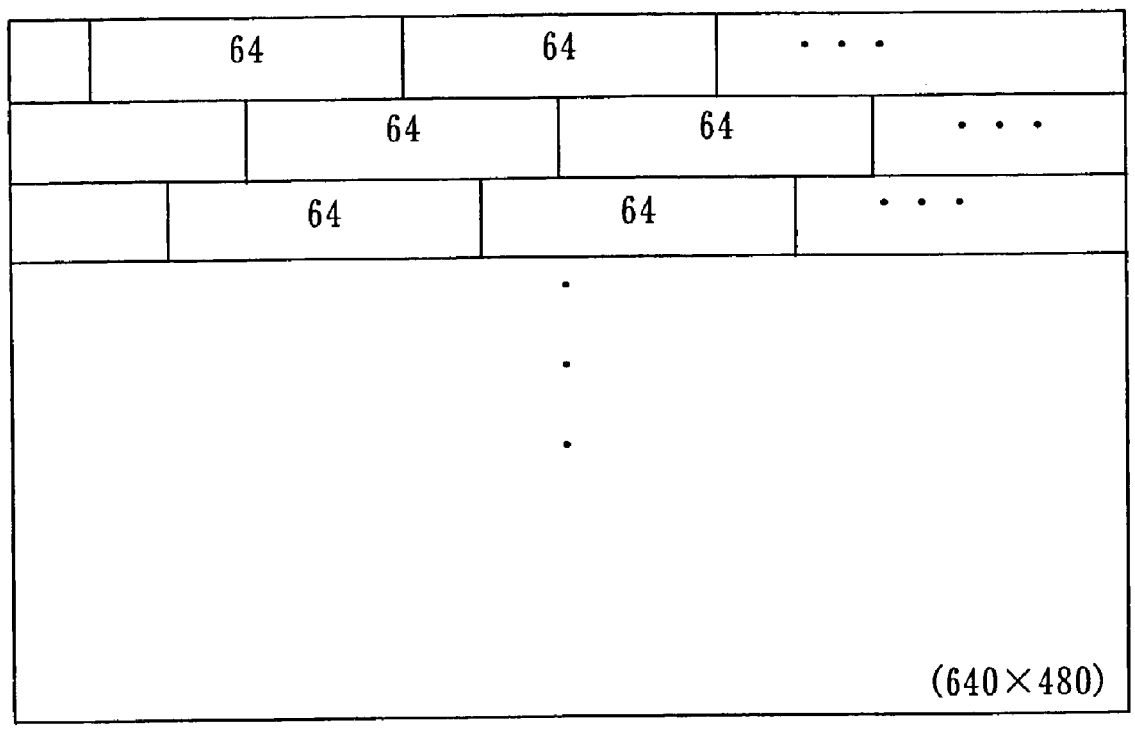
FIG. 31 shows a display section of the image display apparatus in the third example, illustrating a plurality of blocks in another exemplary manner.

FIG. 30 shows an exemplary display section in which the pixels are divided into blocks by the block formation section 256. In the third example, each block includes 64 pixels. FIG. 31 shows another an exemplary display section in which the pixels are divided into blocks by the block formation section 256. In FIG. 31, the borders between the blocks are randomly changed. As shown in FIG. 31, one block may include portions of two different adjacent rows.

The number of pixels in each block to be processed with signal expansion can be automatically optimized, and adjusted for each image or each portion of the same image.

In the third example, a 6-bit digital image signal is expanded to an 8-bit digital image signal. A 6-bit digital image signal may be expanded to a digital image signal including 10 or more bits.

According to the third example of the present invention, high quality image display is provided with a simple circuit configuration. Signal expansion is performed for each color components of a color image, by comparing a plurality of image data having a prescribed pixel width and then adding lower bit values which were cut off in the pre-expansion image data. Namely, higher bit values are predicted and reproduced. As a result, color resolution is improved, and thus smooth and linear gradation change is realized.

According to the present invention, a high frequency portion of an image signal, in which the luminance changes pixel by pixel is not processed by signal expansion. Only a low frequency portion of the image signal, in which a series of a prescribed number of pixels have the same pixel value is processed by signal expansion. Therefore, images having a large high frequency portion, such as landscapes portraits, other paintings, and the like can be processed so as to have substantially no blur. Only the pseudo profiles in the low frequency portion can be corrected.

In the first through third examples, a low frequency portion of an input image signal detected by the detection section is expanded. More specifically, a prescribed portion of the input image signal, corresponding to a series of pixels having a first pixel value (for example, $L_i$) and a series of pixels having a second pixel value (different from the first pixel value; for example, $L_i+1$), is expanded as follows. Bit streams having the first pixel value and the second pixel value are supplemented with a prescribed number of bits by the signal expansion section, such that the first pixel value is gradually changed to the second pixel value.

The present invention is not limited to this. In the low frequency portion of the input image signal detected by the detection section, a prescribed portion corresponding to either a series of pixels having a first pixel value or a series of pixels having a second pixel value may be expanded. In this case, bit streams having the first pixel value or the second pixel value are supplemented with a prescribed number of bits by the signal expansion section, such that the first pixel value is gradually changed to the second pixel value. In this case, the signal expansion section adds a prescribed number of fixed bits (e.g., "00") to a portion of the input image signal which is not determined to be a target of signal expansion, as described above.

The image processing apparatuses according to the first and third examples have a structure suitable for products demanded to be produced at low cost, for example, cellular phones, PDAs and other compact display apparatuses. The image processing apparatus in the second example has a structure suitable for products demanded to provide higher quality images than the image processing apparatuses in the first and third examples, for example, large-screen liquid crystal TVs and monitors.

Although not specifically described above, in the third example, an input image signal is specifically divided into a plurality of blocks by processing each of appropriate portions of the input signal as a block, i.e., by controlling the input image signal in an appropriate manner. Therefore, apart of the control section 251 (i.e., software or a control program recorded on a computer-readable recording medium) functions as the block formation section.

An image processing apparatus according to the present invention includes a detection section and a signal expansion section. The detection section detects a low frequency portion of an image signal which is represented by bits. The low frequency portion corresponds to a first series of pixels having a first pixel value and a second series of pixels having a second pixel value, which is different from the first pixel value. The second series of pixels follow the first series of pixels. The signal expansion section expands a prescribed portion of the low frequency portion of the image signal. The prescribed portion includes the first series of pixels and/or the second series of pixels. More specifically, the expansion is performed by adding a prescribed number of bits to a portion of the image signal corresponding to pixels having the first pixel value and/or the second pixel value, such that the first pixel value is gradually changed to the second pixel value. Thus, the signal expansion is performed for each color components of a color image, by comparing a plurality of image data having a prescribed pixel width and then adding lower bit values which were cut off in the pre-expansion image data. This is performed by a simple circuit configuration. Namely, higher bit values are predicted and reproduced. As a result, color resolution is improved, and thus smooth and linear gradation change is realized.

In the case where a block formation section for dividing an input image signal into a plurality of blocks, each corresponding to a prescribed number of pixels, the above-mentioned signal expansion can be performed using a small capacity memory. In other words, the signal expansion is performed for each color components of a color image, by comparing a plurality of image data having a prescribed pixel width and then adding lower bit values which were cut off in the pre-expansion image data. This is performed by a simple circuit configuration. Namely, higher bit values are predicted and reproduced. As a result, color resolution is improved, and thus smooth and linear gradation change is realized.

Even when signals more than 8 bits, for example, signals having 10 bits are realized in the future, the gray scale display capability of image display apparatuses is fully utilized without increasing the number of gray scale bits of the image signal. In the case where borders between blocks for signal expansion are randomly changed row by row, even signal expansion based on blocks including a smaller number pixels can improve the image quality as effectively as signal expansion based on blocks including a larger number of pixels. Thus, a circuit configuration which requires a smaller memory capacity and thus can be produced at lower cost can be realized.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image processing apparatus comprising:
   a detection section for detecting a low frequency portion of each input image signal, represented by bit streams input to each pixel of an image display apparatus, the low frequency portion corresponding to a first series of a first pixel value and a subsequent second series of a second pixel value which is different from the first pixel value by a prescribed amount; and
   a signal expansion section for expanding a prescribed portion of each input image signal which corresponds to at least one of the first series and the second series of the low frequency portion detected by the detection section, by adding a prescribed number of bits to bit streams of the at least one of the first pixel value and the second pixel value, such that the first pixel value is gradually changed to the second pixel value.

2. An image processing apparatus according to claim 1, further comprising a block formation section for dividing each input image signal, represented by bit streams input to each pixel of the image display apparatus, into a plurality of blocks and outputting them, each of the blocks corresponding to a prescribed number of pixels,
wherein the detection section detects the low frequency portion of each input image signal in one block, which corresponds to the first series of the first pixel value and the subsequent second series of the second pixel value which is different from the first pixel value by the prescribed amount.

3. An image processing apparatus according to claim 2, wherein borders between the plurality of blocks are randomly varied row by row of pixels.

4. An image processing apparatus according to claim 1, wherein the detection section determines whether a difference between an initial pixel location of the first series and an initial pixel location of the second series following the first series is equal to a value representing the pixel width of the first series, so as to determine whether each input image signal is to be expanded or not.

5. An image processing apparatus according to claim 1, wherein the signal expansion section adds a prescribed number of bits having a fixed value to a portion of each input image signal which is determined not to be expanded.

6. An image processing apparatus according to claim 1, wherein a difference between the first pixel value and the second pixel value is 1 in the low frequency portion detected by the detection section.

7. An image processing apparatus according to claim 1, wherein the signal expansion section expands a portion from the center of the first series of the first pixel value to the center of the second series of the second pixel value.

8. An image processing apparatus according to claim 1, wherein the prescribed number of bits is 2.

9. An image processing apparatus according to claim 1, wherein the prescribed number of bits is 4.

10. An image processing apparatus according to claim 1, wherein the signal expansion section expands the low frequency portion of each input image signal such that the first pixel value is gradually changed to the second pixel value on a straight line or a curved line.

11. An image processing apparatus according to claim 1, wherein the first series and the second series are arranged in at least one of a horizontal direction in which each input image signal is sequentially transferred on an image display screen of the image display apparatus, a vertical direction which is perpendicular to the horizontal direction, and an oblique direction.

12. An image processing apparatus according to claim 1, wherein a number of gray scale bits handled by the image display apparatus is larger than a number of gray scale bits represented by each input image signal.

13. An image display apparatus for displaying the expanded input image signal using the image processing apparatus according to claim 1.

14. An electronic device comprising the image display apparatus according to claim 13.

* * * * *